(12) United States Patent
Ishimaru et al.

(10) Patent No.: US 7,637,332 B2
(45) Date of Patent: Dec. 29, 2009

(54) TRANSMISSION MECHANISM FOR VEHICLES HAVING HST AND PRESSURE OIL SUPPLY SYSTEM THEREFOR

(75) Inventors: Yoshitaka Ishimaru, Toyonaka (JP); Shusuke Nemoto, Yao (JP); Shigenori Sakikawa, Itami (JP); Kenichi Takada, Kawanishi (JP)

(73) Assignee: Kanzaki Kokyukoki Mfg., Co., Ltd., Amagasaki (JP)

( * ) Notice: Subject to any disclaimer, the term of this patent is extended or adjusted under 35 U.S.C. 154(b) by 0 days.

(21) Appl. No.: 11/959,426

(22) Filed: Dec. 18, 2007

(65) Prior Publication Data

US 2008/0098851 A1 May 1, 2008

Related U.S. Application Data

(60) Division of application No. 11/385,481, filed on Mar. 20, 2006, now Pat. No. 7,422,077, which is a continuation of application No. 10/894,190, filed on Jul. 19, 2004, now Pat. No. 7,140,457, which is a continuation of application No. 10/411,526, filed on Apr. 9, 2003, now Pat. No. 6,830,116, which is a continuation of application No. 10/185,487, filed on Jun. 26, 2002, now Pat. No. 6,571,894, which is a division of application No. 09/485,307, filed as application No. PCT/JP99/03016 on Jun. 4, 1999, now Pat. No. 6,457,546.

(30) Foreign Application Priority Data

| Jun. 5, 1998 | (JP) | ............................. | 1998/158030 |
| Dec. 18, 1998 | (JP) | ............................. | 1998/360170 |
| Dec. 22, 1998 | (JP) | ............................. | 1998/364791 |
| Feb. 17, 1999 | (JP) | ............................. | 1999/038531 |

(51) Int. Cl.
*B60K 17/28* (2006.01)

(52) U.S. Cl. .................................... 180/53.4; 180/337

(58) Field of Classification Search ........... 60/325–494; 74/11–15.88; 180/53.1–53.8, 305, 306, 337, 180/374, 376

See application file for complete search history.

(56) References Cited

U.S. PATENT DOCUMENTS 2,945,382 A 7/1960 Ritter et al.

(Continued)

FOREIGN PATENT DOCUMENTS

DE 195 22 877 A1 2/1996

(Continued)

OTHER PUBLICATIONS

Supplementary Partial European Search Report dated Sep. 5, 2007.

(Continued)

*Primary Examiner*—Paul N Dickson
*Assistant Examiner*—Laura Freedman
(74) *Attorney, Agent, or Firm*—Knobbe Martens Olson & Bear, LLP

(57) ABSTRACT

A transmission mechanism and a pressure oil supply system therefor are provided for use in work vehicles provided with a work device externally of the body of the vehicle at longitudinal one side thereof, the transmission mechanism being simple in construction and serving to shorten the overall length of the vehicle while holding a transmission shaft interconnecting a PTO shaft and an input shaft for the work device close to a horizontal.

A work vehicle provided with a work device in front of the vehicle body comprises a transmission 30 disposed between a differential gear unit 10 and an HST 20 and providing a travel cooperative mechanism, a PTO shaft projecting from the housing of the HST 20, and a PTO cooperative mechanism disposed in the housing for dividedly deriving power for the PTO shaft from the travel cooperative mechanism for the transmission of the power. The HST 20 comprises a hydraulic pump 22 having a pump shaft 22a for receiving an input at its rear end, and a hydraulic motor 23 having a motor shaft 23a for delivering a front wheel driving force and a rear wheel driving force from the front end and rear end thereof, respectively.

4 Claims, 20 Drawing Sheets

U.S. PATENT DOCUMENTS

| | | | |
|---|---|---|---|
| 3,132,533 A | 5/1964 | Baker | |
| 3,360,933 A | 1/1968 | Swanson et al. | |
| 3,485,315 A | 12/1969 | Bergren | |
| 3,522,861 A | 8/1970 | Middlesworth et al. | |
| 3,736,813 A | 6/1973 | Kress et al. | |
| 3,842,694 A | 10/1974 | Marlow | |
| 4,180,981 A | 1/1980 | Pensa | |
| 4,271,725 A | 6/1981 | Takao et al. | |
| 4,579,183 A | 4/1986 | Irikura et al. | |
| 4,613,024 A | 9/1986 | Irikura et al. | |
| 4,631,980 A | 12/1986 | Ishimori | |
| 4,727,759 A | 3/1988 | Yamaoka et al. | |
| 4,843,817 A | 7/1989 | Shivvers et al. | |
| 4,882,940 A | 11/1989 | Yamaoka et al. | |
| 4,893,524 A | 1/1990 | Ohashi et al. | |
| 4,899,525 A * | 2/1990 | Takei et al. | 56/202 |
| 5,069,037 A | 12/1991 | Sakigawa et al. | |
| 5,142,940 A | 9/1992 | Hasegawa | |
| 5,211,064 A | 5/1993 | Betz et al. | |
| 5,241,872 A | 9/1993 | Betz et al. | |
| 5,311,740 A | 5/1994 | Shiba et al. | |
| RE34,833 E | 1/1995 | Hasegawa et al. | |
| 5,392,670 A | 2/1995 | Hauser | |
| 5,542,307 A | 8/1996 | Hasegawa et al. | |
| 5,544,547 A | 8/1996 | Ishimaru | |
| 5,592,817 A | 1/1997 | Nishimura et al. | |
| 5,617,764 A | 4/1997 | Komura et al. | |
| 5,622,051 A | 4/1997 | Iida et al. | |
| 5,636,555 A | 6/1997 | Okada et al. | |
| 5,697,264 A | 12/1997 | Andrews et al. | |
| 5,701,739 A | 12/1997 | Ohashi et al. | |
| 5,755,098 A | 5/1998 | Irikura | |
| 5,823,285 A | 10/1998 | Tsuchihashi et al. | |
| 5,913,950 A | 6/1999 | Matsufuji | |
| 5,979,270 A | 11/1999 | Thomas et al. | |
| 6,073,443 A | 6/2000 | Okada et al. | |
| RE36,807 E | 8/2000 | Okada | |
| 6,318,485 B1 | 11/2001 | Osuga et al. | |
| 6,457,546 B1 | 10/2002 | Ishimaru et al. | |
| 6,571,894 B2 | 6/2003 | Ishimaru et al. | |
| 6,830,116 B2 | 12/2004 | Ishimaru et al. | |

FOREIGN PATENT DOCUMENTS

| | | |
|---|---|---|
| EP | 0 787 615 A2 | 8/1997 |
| EP | 0 987 137 A1 | 3/2000 |
| JP | H07 (1995)-125552 A | 5/1995 |
| JP | 08-004884 A | 1/1996 |
| JP | 09-066749 A | 3/1997 |
| JP | 09-240299 A | 9/1997 |
| JP | 10-129282 A | 5/1998 |
| JP | H10(1998)-159972 A | 6/1998 |
| JP | H10 (1998)-272941 A | 10/1998 |
| JP | 2000-508408 A | 4/2000 |
| WO | WO 97/15764 | 5/1997 |

OTHER PUBLICATIONS

Supplementary European Search Report for European Application EP 99 92 3927 dated Jan. 7, 2008.

Office Action dated Feb. 18, 2009 for Japanese Application No. H11 (1999)-038531, 5 pages.

* cited by examiner

TRANSMISSION MECHANISM FOR VEHICLES HAVING HST AND PRESSURE OIL SUPPLY SYSTEM THEREFOR

RELATED APPLICATIONS

This application claims priority to and is a divisional of U.S. application Ser. No. 11/385,481, filed Mar. 20, 2006 which is a continuation of U.S. application Ser. No. 10/894,190, filed Jul. 19, 2004 now U.S. Pat. No. 7,140,457, issued Nov. 28, 2006 which is a continuation of U.S. application Ser. No. 10/411,526, filed Apr. 9, 2003 now U.S. Pat. No. 6,830,116, issued Dec. 14, 2004 which is a continuation of U.S. application Ser. No. 10/185,487, filed Jun. 26, 2002 now U.S. Pat. No. 6,571,894, issued Jun. 3, 2003, which is a divisional of U.S. application Ser. No. 09/485,307, filed May 15, 2000 now U.S. Pat. No. 6,457,546, issued Oct. 1, 2002 which are incorporated by reference.

BACKGROUND OF THE INVENTION

1. Field of the Invention

The present invention relates to transmission mechanisms for vehicles having an HST (hydrostatic transmission), and more particularly to a transmission mechanism for work vehicles equipped with a work device externally of the vehicle body, and also to a pressure oil supply system for the mechanism.

2. Description of the Related Technology

It is commonly demanded that various vehicles be shortened in forward or rearward length to diminish the turning radius, improve the ease of driving and achieve cost reductions. Especially, this is strongly demanded of work vehicles which are equipped with a work device externally of the vehicle body in front or in the rear thereof.

Work vehicles provided with a work device externally of the vehicle body have a PTO shaft at a portion of the transmission for transmitting power to the work device. With such work vehicles, it is desired that the transmission shaft interconnecting the PTO shaft and the input shaft of the work device be disposed horizontally to the greatest possible extent in order to prevent the joints of the transmission shaft from giving off noise and assure the joints of improved durability. For example, JP-U1 No. 56555/1993 and JP-A No. 204135/1990 disclose transmissions for work vehicles intended to meet this demand. The disclosed arrangements include pulleys or like cooperative means for positioning a PTO shaft 1103 at a lower level than a front axle 1105 to cause the shaft to project from the front end face of the front axle case (as indicated at X in FIG. 19). Generally, the transmission shaft 1104 for a work device 1106 needs to be lengthened (as indicated at Y in FIG. 19) if it is attempted to position the transmission shaft 1104 closer to a horizontal while causing the PTO shaft 1103, as positioned approximately at the same level as the engine drive shaft 1101a, to project from the front end of the front axle case, consequently increasing the overall vehicle length. Alternatively, the transmission shaft 1104 must be inclined (as indicated at Z in FIG. 19) if an attempt is made to shorten the overall vehicle length while causing the PTO shaft 1103 to project from the front end of the front axle case at substantially the same level as the engine drive shaft 1101a, consequently increasing the load on the transmission shaft and impairing the durability of the transmission shaft. In view of these structural drawbacks, the transmissions disclosed in the foregoing publications are so constructed as stated above.

In the case of the conventional construction described, however, a differential gear unit is to be interposed between the engine output shaft (or HST motor shaft) and the PTO shaft, so that the cooperative mechanism between the two shafts must be adapted to avoid the interference with the differential gear unit. This results in an increase in the vehicle cost and an impaired maintenance work efficiency.

With vehicles, especially with work vehicles, it is known to dividedly derive a rear wheel driving force from the output of an HST for driving the front wheels. JP-A No. 66749/1997, for example, discloses such a transmission mechanism. With reference to FIG. 20 showing such a conventional transmission mechanism as is disclosed in this publication, a vehicle comprising a differential gear unit 1140, HST 1120 and drive source 1110 which are arranged from the front of the vehicle rearward has a transmission 1130, in which a driving force from the drive source is divided into a front wheel driving force and a rear wheel driving force. This construction has the following drawbacks. Incidentally, indicated at 1131 in the drawing is a front wheel drive shaft which is coupled to the differential gear unit 1140 for driving front axles 1151, and at 1132 is a rear wheel drive shaft which is connected to a rear axle 1152 by an unillustrated transmission shaft.

The transmission mechanism shown in FIG. 20 essentially requires the transmission 1130, which increases the number of parts and the cost. The provision of the transmission 1130 further entails the problem of impairing the reliability of the vehicle. Since the transmission 1130 serves as a power transmission path for both the front wheel driving force and the rear wheel driving force, the components of the transmission are burdened with a great load. Accordingly, the gears and other components are susceptible to damage, which lowers the reliability of the vehicle. Furthermore, the transmission 1130 is provided in a limited space between the differential gear unit 1140 and the HST 1130, necessitating difficult installation work, which leads to the problem that the vehicle is inefficient to assemble in its entirety.

With work vehicles equipped with a work device externally of the vehicle body, there is a need to provide a considerable distance between the engine and the HST because it is necessary to interconnect the drive source and the HST by means of universal joints. Stated more specifically, the drive source is installed on the vehicle body with rubber vibration isolators interposed therebetween, while the HST is connected to the differential gear casing which is fixed to the front axle cases. A vibration difference therefore occurs between the drive source and the HST. Accordingly, to interconnect the two components by a shaft with the vibration difference absorbed, universal joints are used for the shaft to be connected between the drive source and the HST. For this reason, there is a need to provide a distance permitting the arrangement of two universal joints in series between the HST and the drive source.

With vehicles wherein a PTO unit is provided which has a PTO shaft for a mower or like work device, and a hydraulic clutch for effecting or interrupting the transmission of the output of the PTO shaft, it is desired to position the PTO shaft inwardly of the vehicle body to the greatest possible extent while shortening the distance between the hydraulic clutch and a charge pump for supplying a hydraulic fluid to the clutch.

A shorter distance between the pump and the clutch is desirable because of the difficulty to be encountered in hydraulically controlling the clutch if the distance is great. Inward positioning of the PTO shaft is desirable in order to reduce the overall length of the vehicle including the mower or the like while horizontally positioning the connecting rod between the shaft and the mower or the like.

This will be described with reference to a front mount mower tractor which is equipped with a mower in front of the vehicle body. If it is attempted to shorten the overall length of the vehicle including the mower in an arrangement wherein the PTO shaft is caused to project forward from the front axle case, the transmission shaft interconnecting the PTO shaft and the mower must be given a great inclination. The transmission shaft is pivotally moved vertically when the mower is raised or lowered. If the inclination of the transmission shaft is greater, the angle through which the shaft is pivotally moved also increases, permitting the transmission shaft joints to produce a louder noise and impairing the durability of the joints. It is therefore desired that the PTO shaft be disposed inward longitudinally of the vehicle body (toward the rear of the vehicle body in the case of the front mount mower tractor) in order to shorten the overall length of the vehicle while obviating these drawbacks.

Thus, it is desired that the vehicle wherein the power of the drive source is transmitted to the travel device and to the PTO unit via the HST fulfill the foregoing requirements, whereas transmission mechanisms still remain to be developed which meet all of these requirements.

Conventionally, the following construction has been adopted for the pressure oil supply system for supplying a hydraulic fluid to power steering hydraulic devices or to hydraulic devices for lifting work devices such as mowers. The conventional pressure oil supply system has an arrangement wherein a hydraulic pump for supplying the pressure oil is attached to the drive source of the vehicle, and the casing of the differential gear unit is used also as an oil tank serving as the oil supply source for the hydraulic pump. The pump shaft of the hydraulic pump can be coupled to the drive source easily, while the use of the casing eliminates the cost increase and the increase of the vehicle size that would result if an oil tank for specific use is provided.

However, this arrangement requires an elongated inflow line interconnecting the hydraulic pump and the casing, consequently offering the piping increased resistance which is liable to impair the operation efficiency of the pump. Although the inflow line can be given an increased diameter to reduce the piping resistance, this will entail an increased cost.

The drive source is installed in the vehicle body with use of rubber vibration isolators, while the casing is fixed to the axle case, so that a vibration difference occurs between the hydraulic pump attached to the drive source and the casing. This results in the necessity of using a flexible tube or like pipe which is capable of absorbing the vibration difference between the pump and the casing for the inflow line for holding these two components in communication, hence a higher cost.

In order to shorten the distance between the hydraulic pump and the oil tank, it is possible to install a specific tank in the vehicle, as positioned in a vacant space in the vicinity of the drive source, but the installation of the specific tank leads to a higher cost and a greater vehicle size. Use of such a tank still involves the problem of vibration difference between the oil tank and the hydraulic pump.

SUMMARY OF CERTAIN INVENTIVE ASPECTS

A first object of the present invention is to provide a transmission mechanism which is simple in construction for use in work vehicles equipped with a work device externally of the vehicle body, the transmission mechanism being adapted to shorten the overall length of the vehicle.

A second object of the invention is to provide a transmission mechanism for use in such work vehicles which is adapted to shorten the overall length of the vehicle body while permitting a transmission shaft to be positioned close to a horizontal for interconnecting a PTO shaft for driving the work device and the input shaft of the work device.

A third object of the invention is to provide a transmission mechanism of simple construction for the front wheels and rear wheels of vehicles including an HST, the transmission mechanism comprising components which are rendered free of excessive loads.

A fourth object of the invention is to provide a transmission mechanism which realizes at the same time a vehicle of shortened overall length, positioning of a PTO shaft longitudinally inwardly of the vehicle body and provision of a sufficient distance between the drive source and an HST.

A fifth object of the invention is to provide a pressure oil supply system of simple construction for a hydraulic device for use in vehicles having the hydraulic device, the system being adapted to render the vehicle compact and less costly.

To fulfill the foregoing objects, the present invention provides a transmission mechanism for a work vehicle having a differential gear unit, an HST and a drive source which are arranged in a body of the vehicle from longitudinal one side of the vehicle body, i.e., one side thereof in a first direction, toward the other side thereof in a second direction so as to drive axles positioned toward said one side, the vehicle having a work device disposed externally of the vehicle body toward the first direction, the transmission mechanism being characterized in that the mechanism comprises:

a travel power transmission path for transmitting power from the drive source to the differential gear unit via the HST, and a PTO power transmission path for dividedly transmitting the power from the travel power transmission path to a PTO unit for driving the work device, the travel power transmission path further comprising a transmission for transmitting an output of the HST to the differential gear unit, the transmission constituting a portion of the travel power transmission path and having a casing, and an input portion for receiving the power from the drive source, an output portion coupled to the differential gear unit and a travel cooperative mechanism coupling the input portion to the output portion which are housed in the casing, the HST comprising a hydraulic pump having a pump shaft extending longitudinally of the vehicle body, a hydraulic motor having a motor shaft rotatable in cooperation with the hydraulic pump, and an HST housing accommodating the hydraulic pump and the hydraulic motor therein, the pump shaft having one end extending outward from the HST housing in the second direction and being connectable to a shaft of the drive source, the motor shaft having one end extending in the first direction into the transmission casing and connected to the input portion of the transmission, the PTO unit comprising a PTO shaft supported by the HST housing so as to extend from the HST housing in the first direction, and a PTO cooperative mechanism accommodated in the HST housing and coupling the pump shaft to the PTO shaft to provide the PTO power transmission path (first feature of the invention).

To fulfill the foregoing objects, the present invention also provides a transmission mechanism comprising a differential gear unit an HST and a drive source which are arranged in a body of a vehicle from longitudinal one side of the vehicle body, i.e., one side thereof in a first direction, toward the other side thereof in a second direction so as to drive axles positioned toward said one side, the transmission mechanism being characterized in that:

the HST comprises a hydraulic pump having a pump shaft extending longitudinally of the vehicle, a hydraulic motor cooperative with the hydraulic pump and having a motor shaft disposed in parallel to the pump shaft, and a housing accommodating the hydraulic pump and the hydraulic motor therein, the hydraulic pump being adapted to receive power from the drive source by the pump shaft at an end thereof toward the second direction, the hydraulic motor being adapted to output a driving force to be delivered to the differential gear unit from the motor shaft at an end thereof toward the first direction and to output a driving force to be delivered to wheels toward the second direction from the motor shaft at an end thereof toward the second direction (second feature of the invention).

To fulfill the foregoing objects, the present invention further provides a transmission mechanism for a vehicle so adapted that power from a drive source installed in a body of the vehicle is transmitted to a travel device and a PTO unit via an HST disposed outwardly of the drive source in a longitudinal direction of the vehicle, the transmission mechanism being characterized in that:

the mechanism comprises the HST for receiving a driving force from the drive source, and the PTO unit for receiving an output from the HST, the PTO unit comprising a PTO shaft, a hydraulic clutch for effecting or interrupting power transmission to the PTO shaft, a charge pump for supplying a hydraulic fluid to the clutch, and a hydraulic circuit for interconnecting the clutch and the charge pump, the HST comprising a hydraulic pump having a pump shaft extending longitudinally of the vehicle and connected at an inward end thereof to a shaft of the drive source, a hydraulic motor having a motor shaft rotatable in cooperation with the hydraulic pump, and a housing accommodating the hydraulic pump and the hydraulic motor therein, the pump shaft having an outward end projecting from the housing outward longitudinally of the vehicle, the housing having a main body accommodating the hydraulic pump and the hydraulic motor therein, and an extension extending outward widthwise of the vehicle from a side of the main body at which side the hydraulic pump is positioned, the charge pump having a casing liquid-tightly surrounding the projection of the pump shaft and being adapted to perform a pumping action for the clutch by the rotation of the pump shaft, the PTO shaft being supported by the housing extension longitudinally of the vehicle and having an outer end projecting outward longitudinally of the vehicle, the hydraulic clutch being supported by the PTO shaft within the housing extension (third feature of the invention).

To fulfill the foregoing objects, the present invention further provides a pressure oil supply system for a vehicle comprising a hydraulic device, the vehicle being so adapted that power from a drive source installed in a body of the vehicle is transmitted to a drive axle via an HST disposed adjacently to the drive source along the longitudinal direction of the vehicle and via a differential gear device coupled to the HST along said longitudinal direction, the HST comprising an HST pump having a pump shaft extending longitudinally of the vehicle and connected to the drive source by a shaft, an HST motor cooperative with the hydraulic pump and having a motor shaft, and a housing accommodating the HST pump and the HST motor therein, the differential gear device having a casing supporting the drive axle, and a differential gear unit housed in the casing and operatively connected to the motor shaft, the pressure oil supply system being characterized in that the system comprises:

a hydraulic pump having a drive shaft supported by the housing so as to cause one end thereof to project outward from the housing, and a pump case formed continuously with the housing so as to liquid-tightly surround the projecting end of the drive shaft, the hydraulic pump being adapted to perform a pumping action by the rotation of the drive shaft, a hydraulic output cooperative mechanism coupling the pump shaft of the HST pump to the drive shaft, an intake line having one end connected to the casing of the differential gear device and the other end connected to the pump case, and a discharge line having one end connected to the pump case and the other end connected to the hydraulic device (fourth feature of the invention).

The transmission mechanism can be so characterized that the HST comprises a hydraulic pump having a pump shaft extending longitudinally of the vehicle, a hydraulic motor cooperative with the hydraulic pump and having a motor shaft disposed in parallel to the pump shaft, and a housing accommodating the hydraulic pump and the hydraulic motor therein, the housing having walls spaced apart from each other and positioned toward the first direction and toward the second direction respectively, the transmission further comprising, between the first-direction wall and the second direction wall, a PTO unit, and a PTO power transmission path for transmitting dividedly to the PTO unit the power to be delivered from the drive source to the HST.

Alternatively, the transmission mechanism can be so characterized that the HST comprises a hydraulic pump having a pump shaft extending longitudinally of the vehicle for receiving a driving force from the drive source, a hydraulic motor cooperative with the hydraulic pump and having a motor shaft disposed in parallel to the pump shaft for outputting a driving force for travel, and a housing accommodating the hydraulic pump and the hydraulic motor therein, the housing having a space accommodating the pump and the shaft therein and serving as a reservoir for lubricating oil, the housing further accommodating a PTO unit, and a PTO power transmission path for transmitting dividedly to the PTO unit the power to be delivered from the drive source to the HST, the PTO unit comprising a clutch for effecting or interrupting transmission of the driving force.

DETAILED DESCRIPTION OF CERTAIN INVENTIVE EMBODIMENTS

Figure 1:
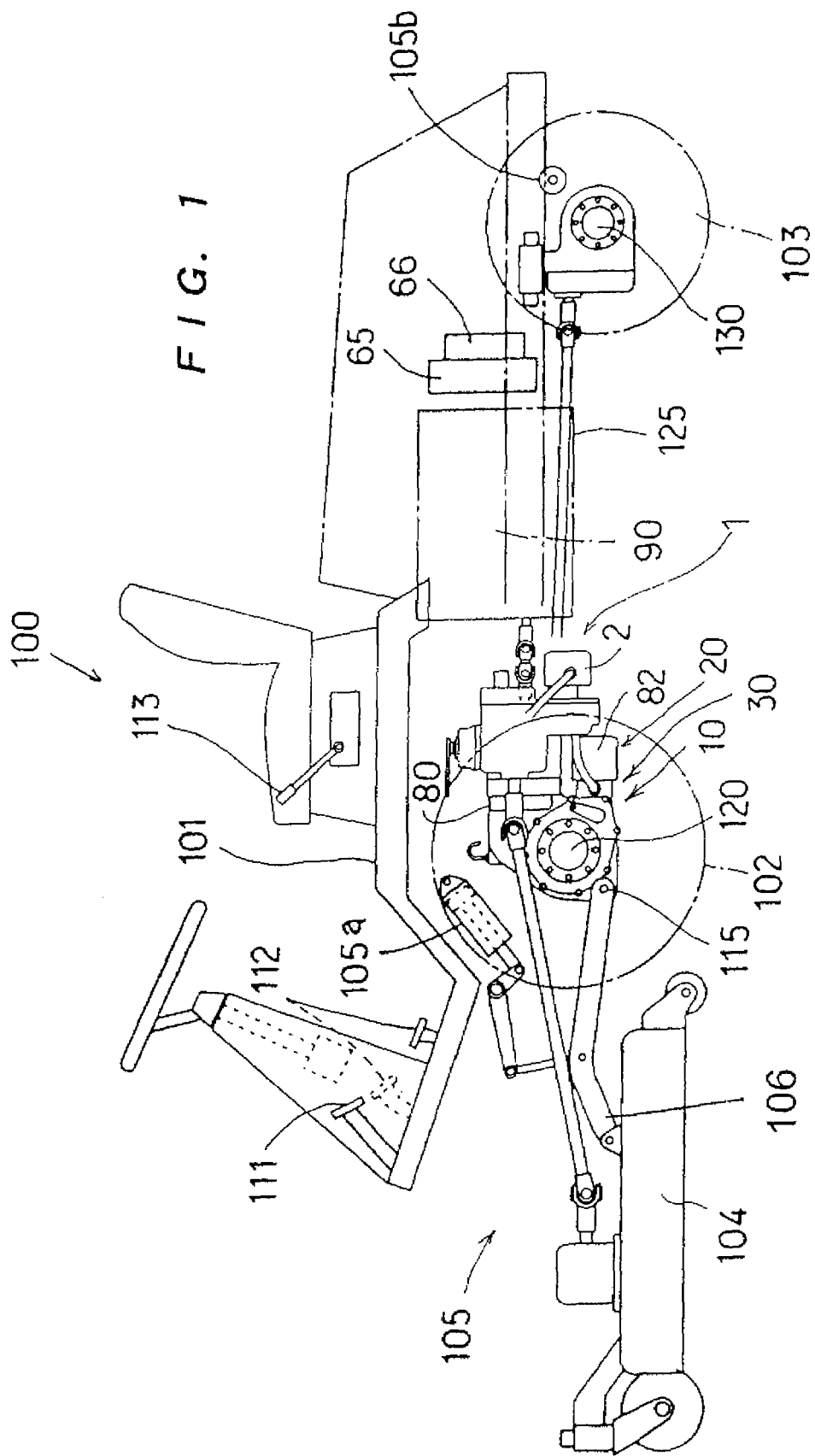
FIG. 1 is a schematic side elevation of a front mount mower tractor comprising a transmission mechanism according to the invention.

Embodiments of transmission mechanism of the invention will be described below with reference to the accompanying drawings. FIG. 1 is a schematic side elevation of a front mount mower tractor 100 having incorporated therein the transmission mechanism of the embodiment.

General Description of Mower Tractor

The front mount mower tractor 100 will be described first with reference to FIG. 1.

In the following embodiment, a first direction along the length of the vehicle body will be referred to as "front," and a second direction therealong as "rear." However, these directions can be in reversed when so required.

The mower tractor 100 comprises a vehicle body 101, front wheels 102 and rear wheels 103 arranged respectively at a front portion and a rear portion of the vehicle body, and a mower 104 disposed in front of the vehicle body. Arranged at a lower portion of the vehicle body 101 are a differential gear unit 10 for driving front axles 120, an HST 20 and a drive source 90 which constitute the transmission mechanism of the present embodiment. A transmission 30 is disposed between the differential gear unit 10 and the HST 20. Indicated at 80 in the drawing is a hydraulic block (center section) formed with oil channels for the HST, etc. According to the present embodiment, the HST 20 and the gear unit 10 are interconnected by the hydraulic block 80. With this vehicle, a front mower lift unit 105a and a power steering unit 105b are included in the hydraulic unit.

The driver's seat of the mower tractor 100 is provided with a master brake pedal coupled to brakes (indicated at 205 in FIG. 4) provided respectively on the left and right axles for actuating these brakes at the same time, turn brake pedals L and R for operating these brakes independently, and a speed change pedal 112 coupled to a hydraulic pump (indicated at 22 in FIG. 4) included in the HST 20. (The drawing shows the turn brake pedal (left) 111, and the turn brake pedal (right) and the master brake pedal are positioned behind and away from the plane of the drawing.) The speed change pedal 112 (see FIG. 1) has a toe pedal member which accelerates the vehicle forward when stepped on, and a heel pedal member which accelerates the vehicle rearward when stepped on. The driver's seat of the mower tractor 100 is further provided with a manual lever 113 which is pivotally movable forward and rearward over a predetermined distance. Depending on the pivotally moved position, a switch (not shown) is turned on or off, giving an on or off signal for controlling a solenoid valve (not shown) to engage or disengage the PTO clutch to be described later. Indicated at 115 are support points provided on the left and right axle cases at the bottom side thereof for suspending the mower 104.

Figure 2:
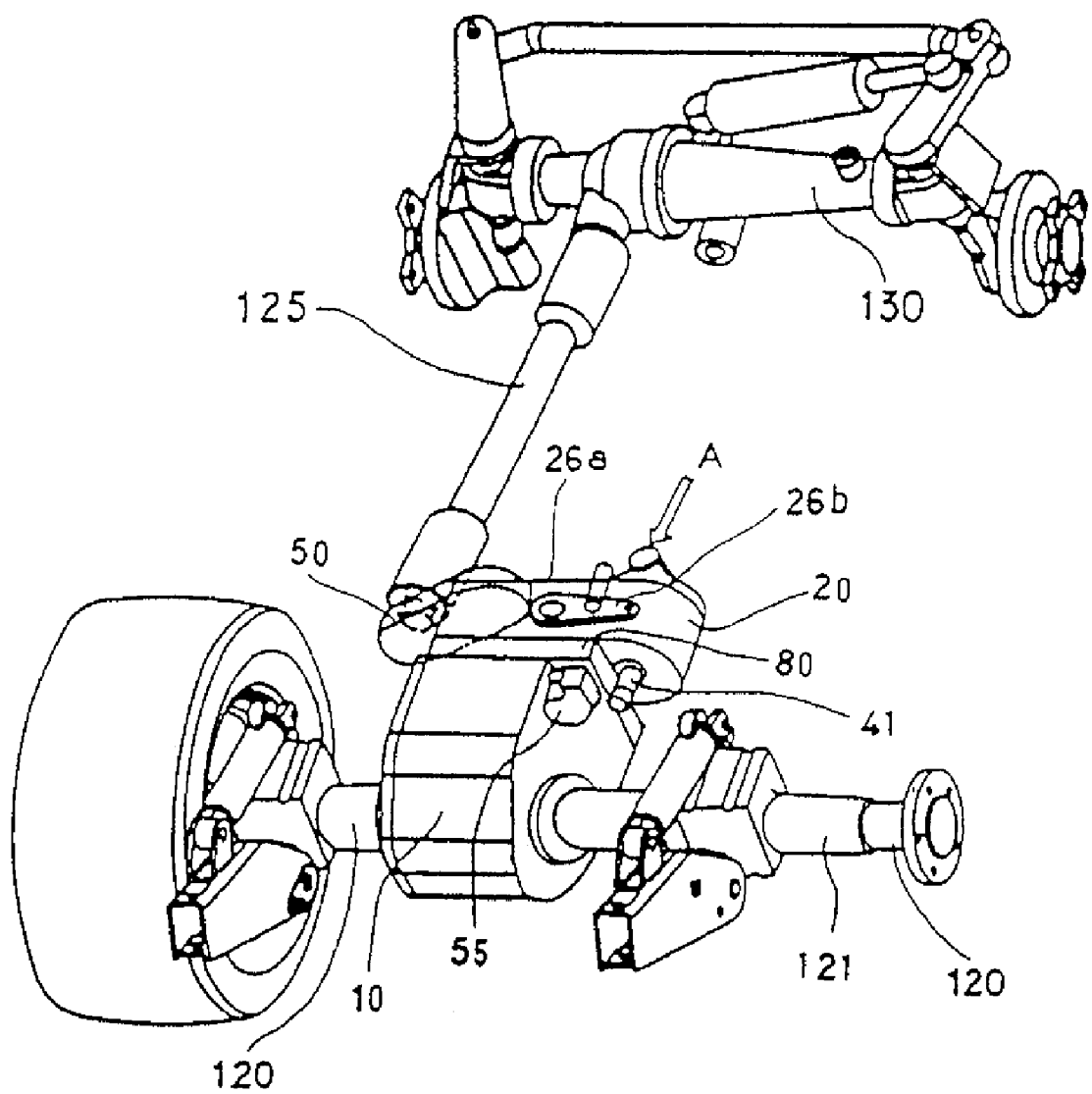
FIG. 2 is a perspective view showing a mechanism for driving the front and rear wheels of the tractor of FIG. 1.

FIG. 2 shows a mechanism for driving the front and rear wheels of the tractor of FIG. 1. Power is input to the mechanism from an engine (not shown) disposed in the rear of the HST 20 in the drawing. A front wheel driving force is delivered to the front axles 120 via the differential gear unit 10 disposed in front of the HST 20. On the other hand, a rear wheel driving force is delivered from a rear wheel output shaft 24a provided in the rear of the HST to rear axles 130 through a transmission shaft 125. The drawing shows the hydraulic block 80, a charge pump indicated at 55 and a PTO shaft indicated at 41 and provided at a front portion of the vehicle for driving the mower.

Figure 3:
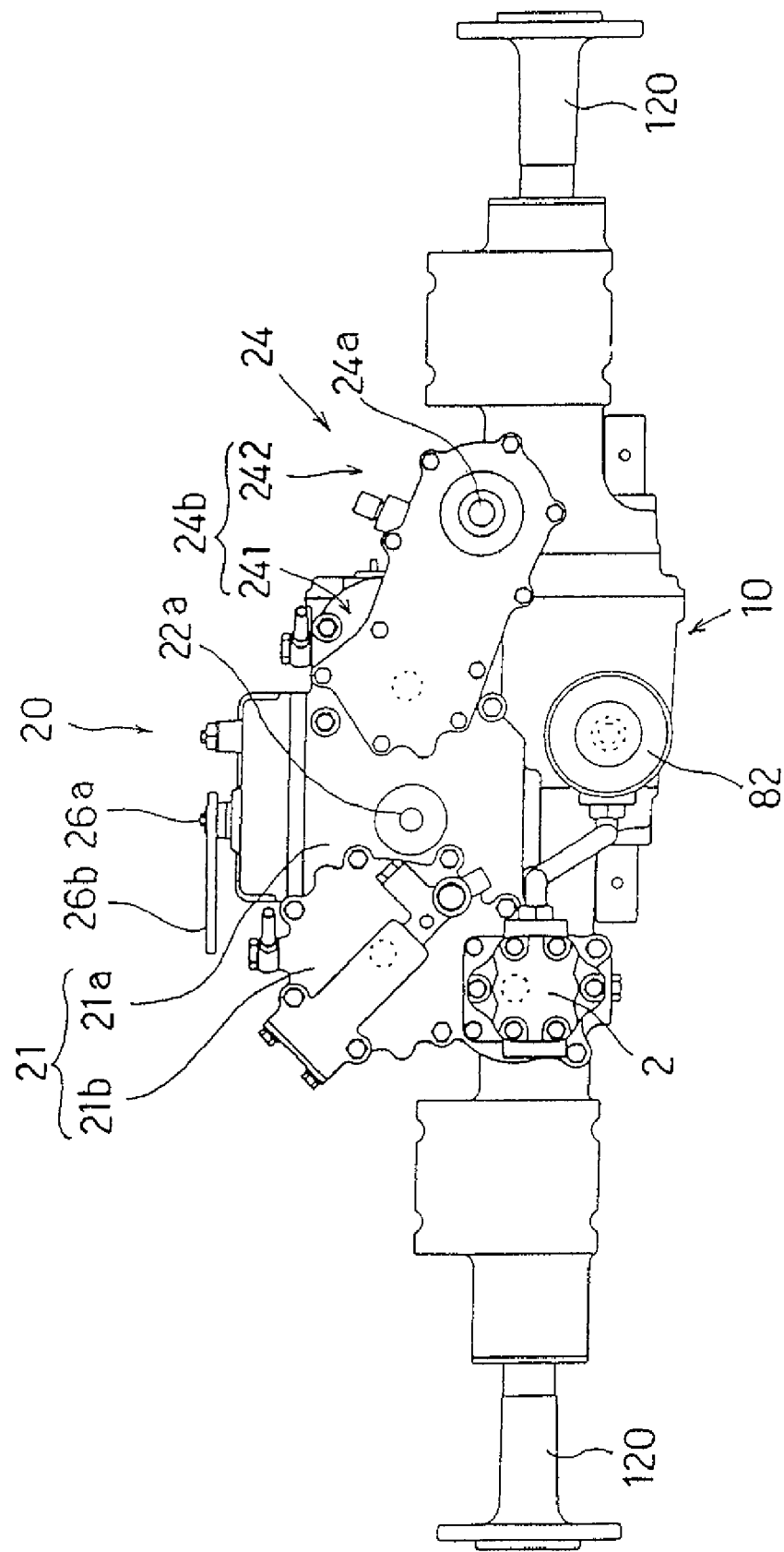
FIG. 3 is a view of the tractor as it is seen in the direction of arrow A in FIG. 2.
Figure 4:
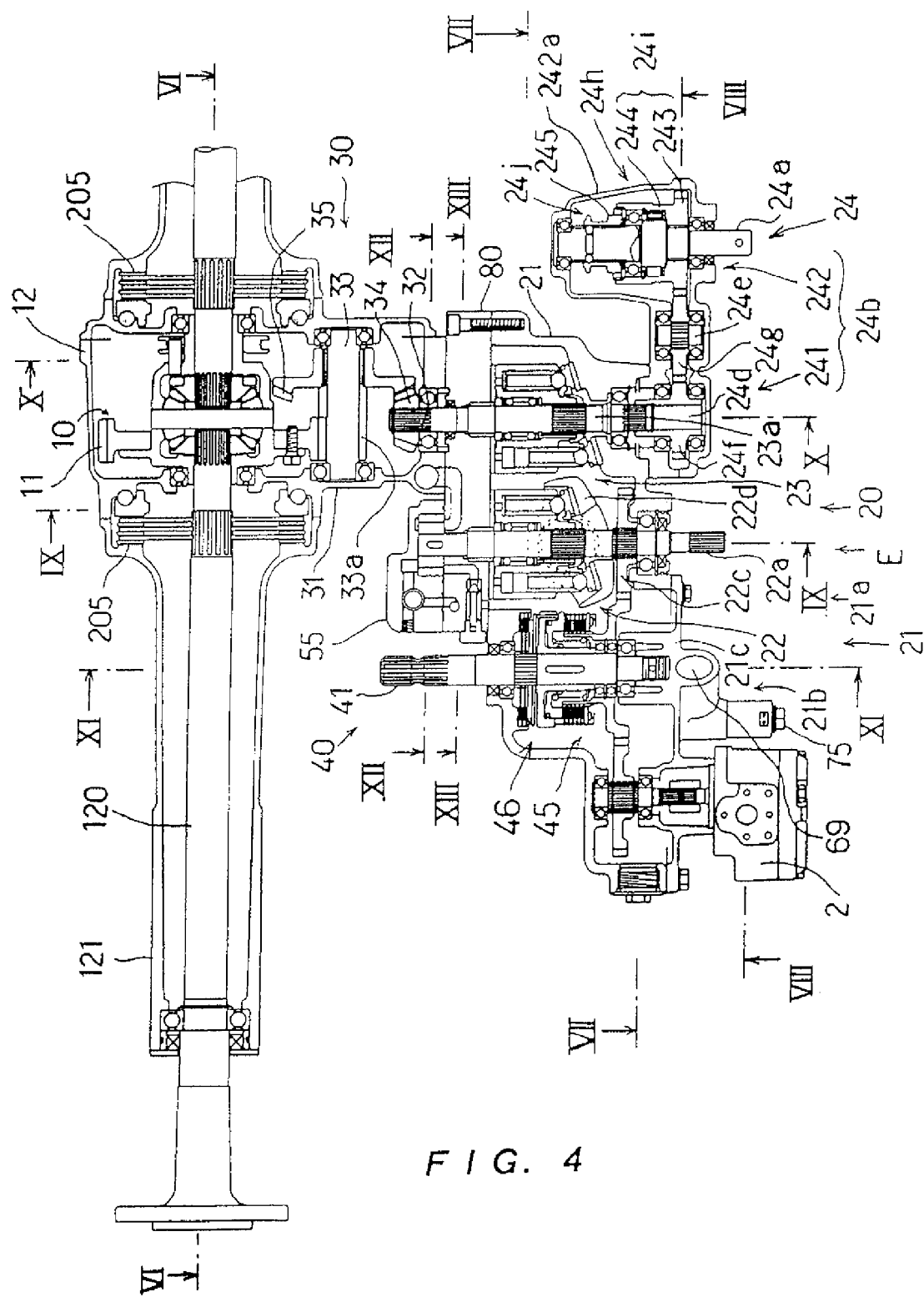
FIG. 4 is a plan view in development and in section showing a first embodiment of transmission mechanism of the invention.

FIG. 3 is a view of the mechanism as it is seen in the direction of arrow A in FIG. 2, FIG. 4 is a cross sectional view in development showing an arrangement including the HST, PTO unit and rear wheel output portion, and FIGS. 7 to 13 are views in sections taken along the respective lines VII-VII to XIII-XIII in FIG. 4.

General Description of Transmission Mechanism

The transmission mechanism according to the present embodiment will be described next. As shown apparently in FIG. 4, the transmission mechanism of the present embodiment comprises a differential gear unit 10 for driving the front axles 120, HST 20 and drive source (not shown in FIG. 4) which are arranged from the front of the vehicle body rearward within the vehicle body, and a transmission 30 is disposed between the gear unit 10 and the HST 20. Indicated at 121 in the drawing is a front axle case housing each front axle 120, at 80 a hydraulic block formed with oil channels for the HST 20, and at 205 a brake for braking the rotation of each of the left and right axles.

Differential Unit

With reference to FIG. 4, the differential unit 10 comprises a housing 12 joined to the opposite front axle cases 121 at the widthwise midportion of the vehicle body, a set of planetary gears enclosed in the housing and cooperative with the opposite front axles 120 and an input gear 11 which is a crown gear cooperative with the planetary gear set. The input gear 11 is in mesh with teeth on an output shaft 33 of the transmission 30 to be described later for power transmission.

HST

The HST 20 comprises a housing 21, hydraulic block 80, and variable displacement hydraulic pump 22 of the axial piston type and fixed displacement hydraulic motor 23 of the axial piston type which are supported by the block and encased in the housing 21.

The housing 21 has a main body 21a located in approximately the same position as the differential gear unit 10 with respect to the widthwise direction of the vehicle body, and an extension 21b extending leftward from the main body 21a. The hydraulic pump and motor 22 and 23 are accommodated in the housing main body 21a. Encased in the housing extension 21b is a PTO unit 40 for driving the mower. Incidentally, the terms left and right are used for the present embodiment as the vehicle is seen from the rear forward.

The housing 21 is in the form of a cube having a rear wall extending widthwise of the vehicle, left and right side walls extending forward from opposite ends of the rear wall, and a front wall interconnecting the forward ends of the side walls. The front wall has an opening in the region thereof corresponding to the main body, while the rear wall has an opening in the region thereof corresponding to the extension. Thus, the main body 21a of the housing is open toward the front and has a rear side closed with the rear wall. On the other hand, the extension 21b is closed with the front wall at its front side and open at its rear side. The front opening of the main body 21a is closed with the hydraulic block 80, and the rear opening of the extension 21b is closed with a closing member 21c. This provides the following advantage. If both the main body 21a and the extension 21b are opened at their front sides in the structure comprising the extension 21b in addition to the body 21a, there arises a need to increase the length of the hydraulic block 80 widthwise of the vehicle body for closing the opening to entail a cost increase due, for example, to an increase in the amount of material. The hydraulic block 80 requires a considerable thickness so as to withstand the pressure of the hydraulic fluid circulating through the pump 22 and motor 23, so that the amount of material increased by increasing the widthwise length of the block 80 increases in proportion to the thickness. Further the housing 21 having the structure described can be cast easily by removing the mold for the main body 21a forward, and the mold for the extension 21b rearward.

The PTO shaft 41 is supported at two points within the HST housing extension 21b by a bearing mounted on the front wall of the extension 21b and a bearing mounted on the closing member 21c.

Figure 9:
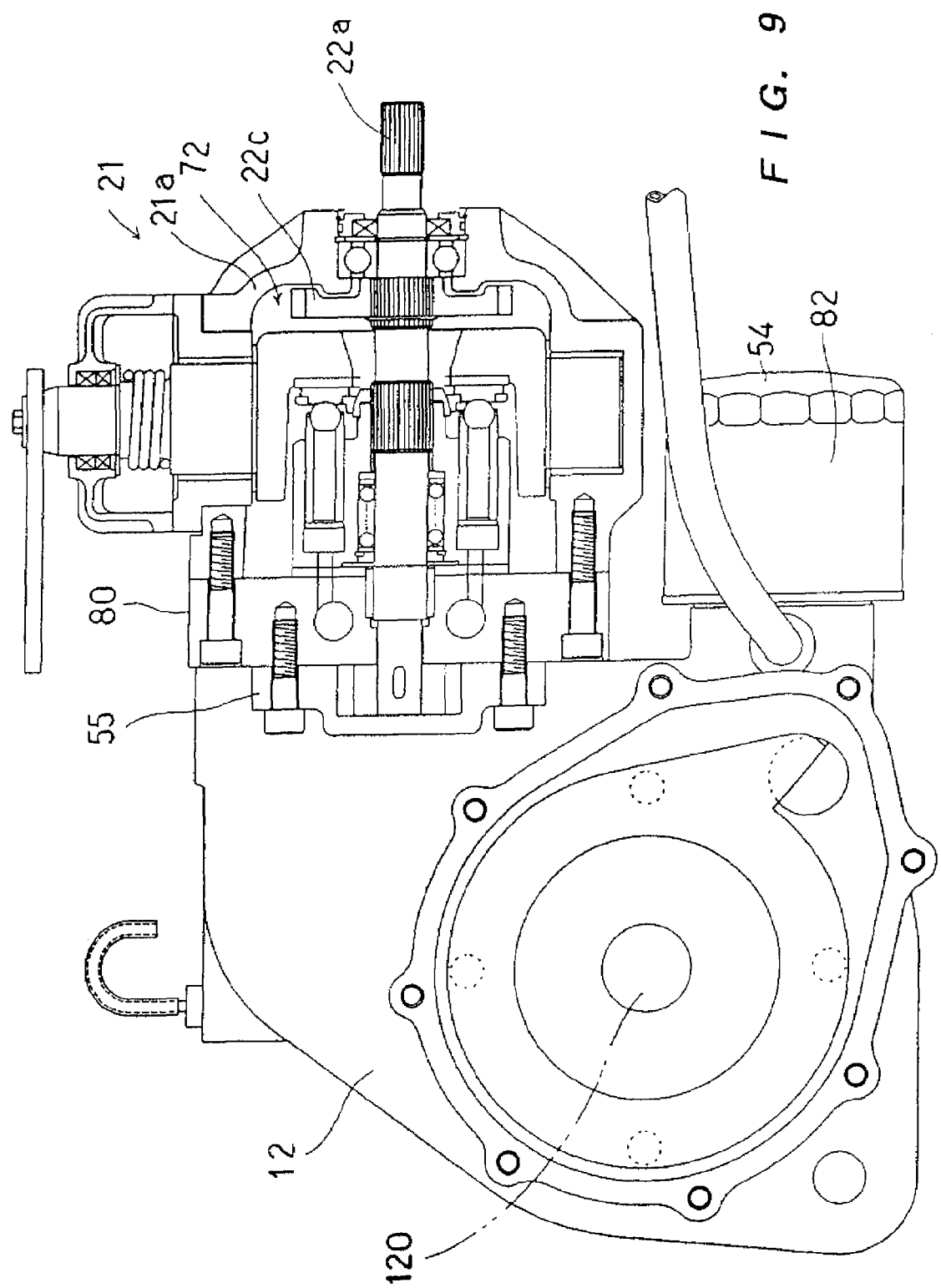
FIG. 9 is a view in section taken along the line IX-IX in FIG. 4.

As shown in FIG. 4 and FIG. 9 which is a view in section along the line IX-IX in FIG. 4, the hydraulic pump 22 has a pump shaft 22a extending longitudinally of the vehicle body. The hydraulic pump 22 is of the variable displacement type having a swash plate for giving a variable displacement. The swash plate is connected to the speed change pedal 112 disposed in the vicinity of the driver's seat by a swash plate coupling pin 26a (see FIGS. 2 and 3) supported by the housing 21, an arm 26b operatively connected to the pin 26a and a suitable connecting member (not shown) such as a wire. The pump shaft 22a has a rear end projecting rearward from the housing 21 and connected to the output shaft of the unillustrated engine by a universal joint. The pump 22a has a front end projecting forward from the housing 21 and extending through the hydraulic block 80 to transmits power to the charge pump 55. A gear 22c is nonrotatably supported by the pump shaft 22a at the portion thereof positioned rearwardly of the swash plate.

The shaft 23a of the hydraulic motor 23 has a front end portion projecting forward from the housing 21, extending through the block 80 and coupled to an input gear 11 of the differential gear unit 10. The motor shaft 23a has a rear end portion projecting rearward from the housing 21 for delivering rear wheel driving force to a rear wheel output unit 24.

Further according to the present embodiment, the pump shaft 22a and the motor shaft 23a are arranged approximately in the same horizontal plane, thereby making it possible to dispose the engine at a lower level for connection to the pump shaft 22a by a shaft and to lower the center of gravity of the vehicle to give improved stability to the vehicle. In the conventional arrangement wherein the pump shaft 22a to be connected to the drive shaft of the engine is positioned above the motor shaft 23a, the engine is positioned at a higher portion of the vehicle, consequently raising the center of gravity of the vehicle and impairing the stability of the vehicle, whereas the present embodiment is free of such a drawback.

Although the HST housing main body 21a is integral with its extension 21b according to the present embodiment, these components can be separate members like the transmission casing 31 to be described below.

Transmission

The transmission 30 comprises a casing 31, an input gear 34 serving as a transmission input portion for receiving within the casing 31 the power delivered from the engine via the HST 20, and an output gear 33a providing a transmission output portion for delivering the power to the input gear 11 of the differential gear unit 10. The casing 31 is positioned as held between the gear unit 10 and the HST housing main body 21a. An output shaft 33 is supported by the casing 31 and provided with an input gear 35 and the output gear 33a for transmitting the drive force to the opposite front axles 120.

PTO Unit

Figure 5:
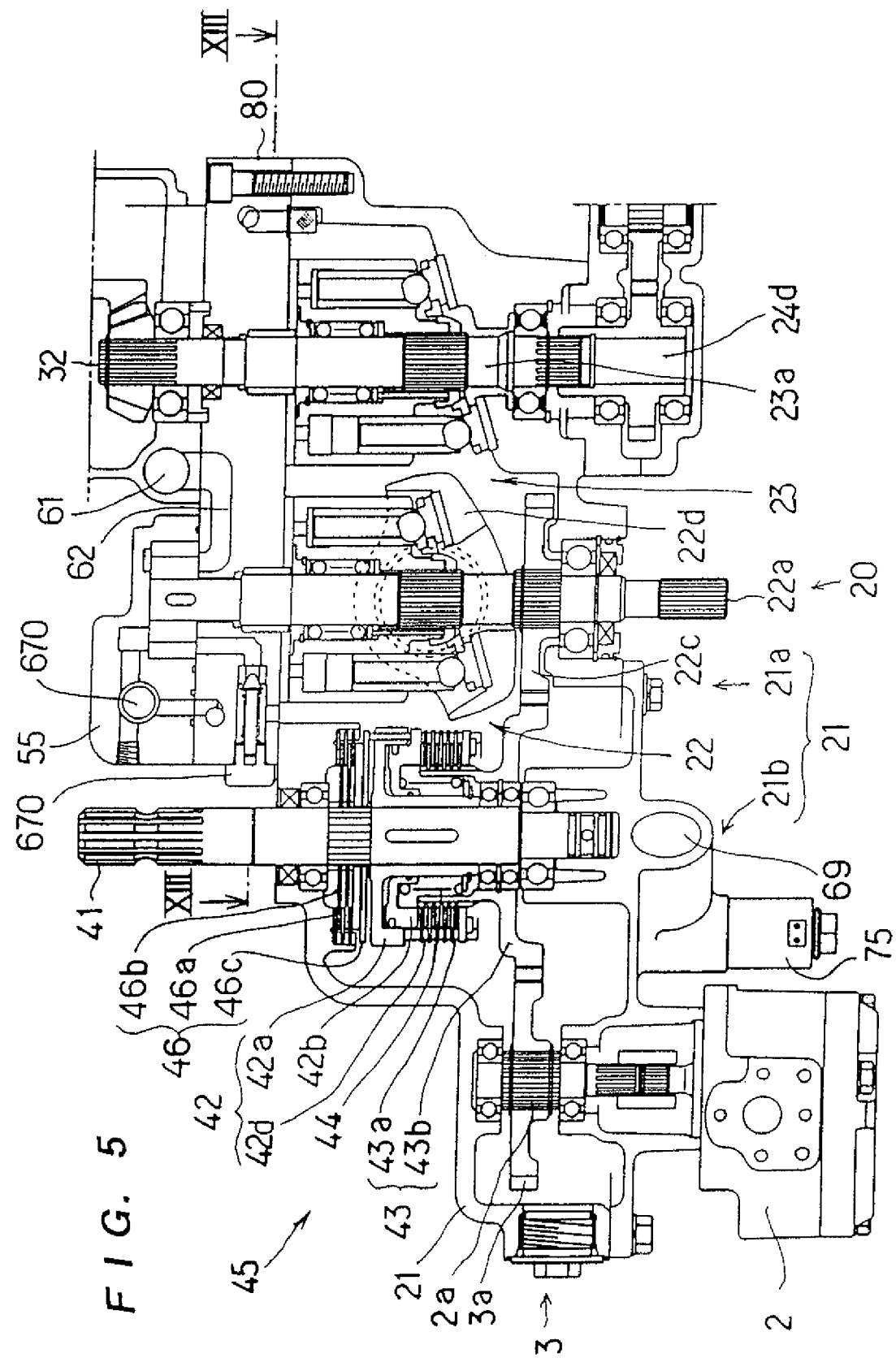
FIG. 5 is a view in section chiefly showing an HST and a PTO unit of FIG. 4.
Figure 6:
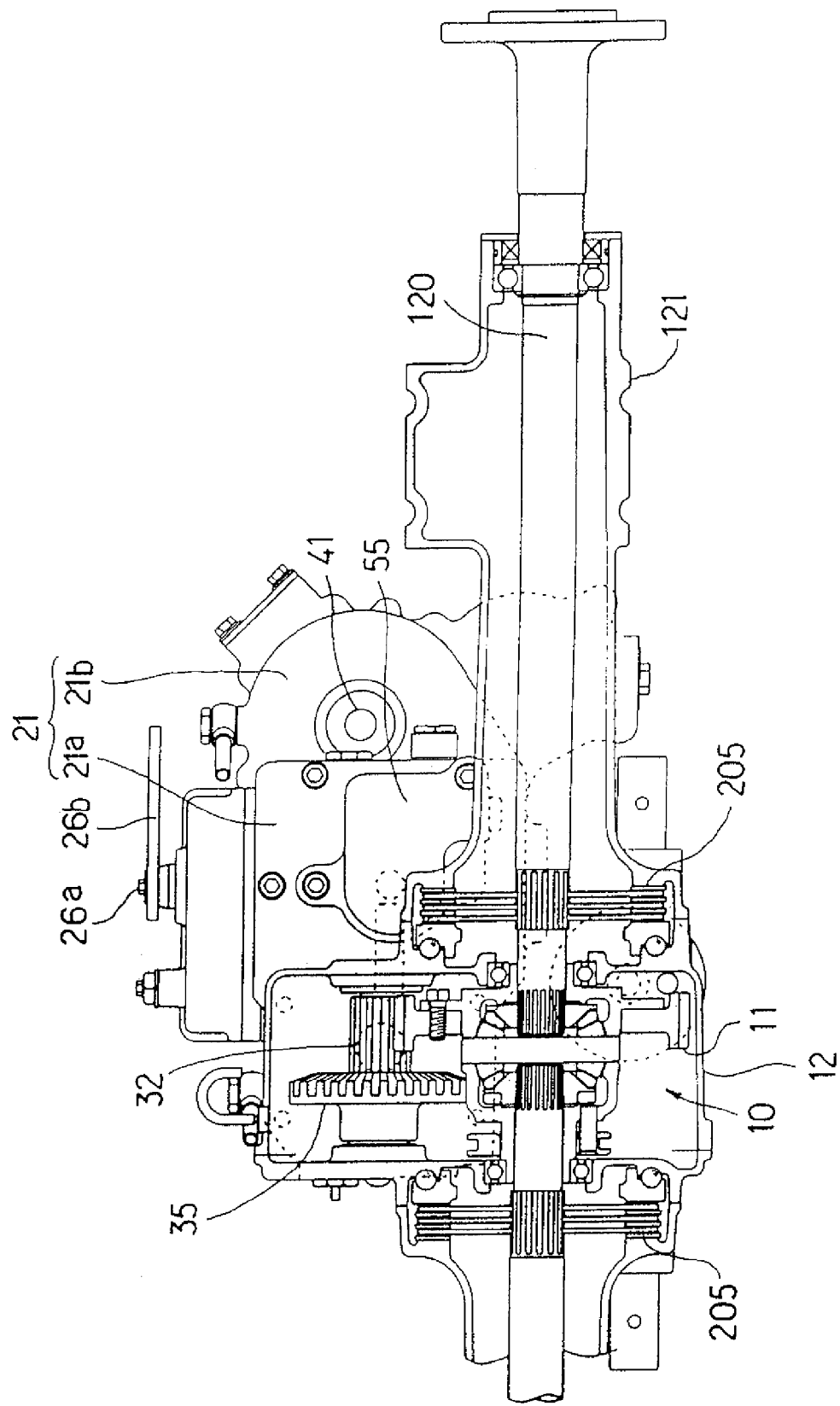
FIG. 6 is a view in section taken along the line VI-VI in FIG. 4.
Figure 11:
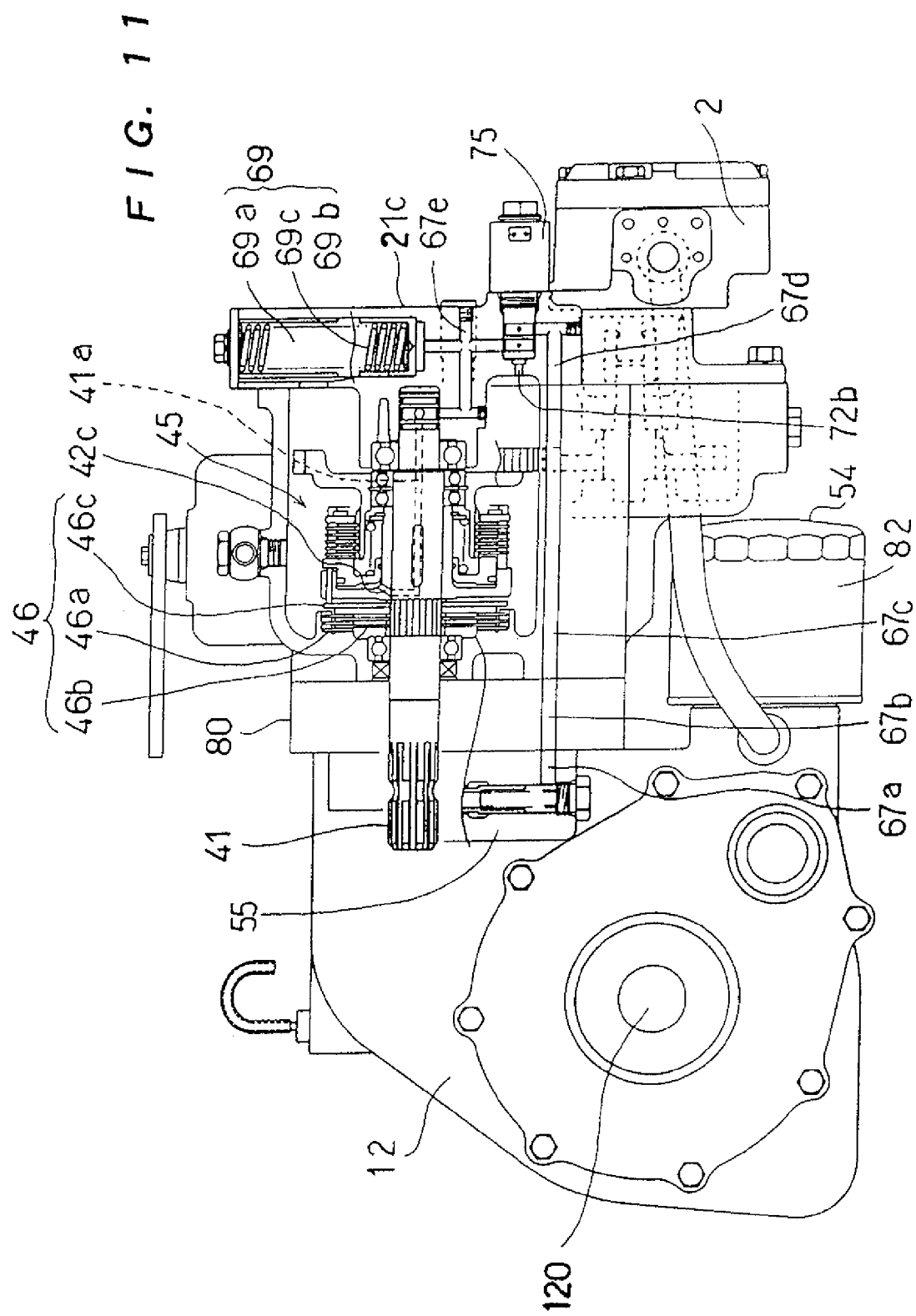
FIG. 11 is a view in section taken along the line XI-XI in FIG. 4.

As shown in FIG. 4, FIG. 5 and FIG. 11 which is a view in section along the line XI-XI in FIG. 4, the PTO unit 40 comprises the PTO shaft 41 which is supported by the front wall of the housing extension 21b and the closing member 21c and which has a front end portion projecting forward from the extension 21b, a driven member (clutch member) 42 supported by the PTO shaft nonrotatably but axially slidably, and a drive member (gear 43b) meshing with the gear 22c and supported by the PTO shaft 41 rotatably but axially nonslidably. The clutch of the PTO unit is engaged or disengaged by the pressure of the hydraulic fluid sent forward from the charge pump 55 through an oil channel (PTO line 67) formed in the hydraulic block 80, housing 21 and closing member 21c. Indicated at 69 in the drawing is an accumulator which is provided in the PTO line 67 and which functions as a hydraulic shock absorbing member for preventing the oil from the charge pump 55 from acting abruptly to smoothly engage the clutch 45.

Power Transmission Path for Travel

With reference to FIGS. 4 and 9, a description will be given first of a travel power transmission path extending from the engine to the differential gear unit 10 and included in the transmission mechanism thus constructed. As already described, the rear end portion of the pump shaft 22a projects rearward from the HST housing 21 and is connected at the projecting portion to the engine output shaft by a transmission shaft and a universal joint. On the other hand, the front end portion of the motor shaft 23a extends into the main body 31a of the transmission casing, providing a transmission input shaft 32 nonrotatably joined to the input shaft 34. According to the present embodiment, the motor shaft 23a and the transmission input shaft are provided by a common shaft, whereas an independent input shaft can be provided as supported by the casing main body 31a and connected to the motor shaft 23a nonrotatably about the axis, with the input shaft 34 nonrotatably mounted on the input shaft. In this case, the independent input shaft and the input gear nonrotatably supported thereby provide the transmission input portion.

The output gear 33a is nonrotatably provided on the output shaft 33. The output shaft 33 is supported above the differential gear unit 10 and extends widthwise of the vehicle body as seen in FIG. 4. The gear 35 is further supported by the output shaft 33. The gear 35 is in mesh with the gear 34 on the input shaft 32.

Thus according to the present embodiment, a travel cooperative mechanism for transmitting the drive force of the engine to the differential gear unit 10 is provided by the HST 20 including the pump shaft 22a and the motor shaft 23a, input shaft 32, input gear 34 nonrotatably supported by the input shaft 32, gear 35 meshing with the input gear 34, output shaft 33 nonrotatably supporting the gear 35 thereon, and output gear 33a nonrotatably provided on the output shaft 33 and meshing with the input gear 11 of the differential gear unit.

PTO Power Transmission Path

With reference to FIGS. 4, 5, 7 and 11, a description will be given next of a PTO transmission path for deriving power from the travel power transmission path and transmitting the power to the PTO shaft. As shown in FIG. 4, the pump shaft 22a within the HST housing 21 has the gear 22c supported on a portion thereof rearward from the hydraulic pump main body and nonrotatably relative to the shaft. The gear 22c is in mesh with the gear 43b of the clutch 45 to be described later. The gear 43b is supported by the PTO shaft 41, with the clutch driven member (clutch member) 42 interposed therebetween. Thus, a PTO cooperative mechanism for transmitting power from the pump shaft 22a to the PTO shaft 41 is provided by the gear 22c nonrotatably supported by the pump shaft 22a, clutch 45 in engagement with the gear 22c and the driven member 42.

The present embodiment includes a brake member 46 disposed in the rear of the closing member 21c and operatively connected to the clutch member 42 as shown in FIGS. 4, 5, and 11, such that the brake is released when the clutch is engaged, or conversely the brake is actuated when the clutch is disengaged. The brake member 46 thus provided stops the rotation of the mower against the force of inertia thereof simultaneously when the drive force for the mower is cut off.

Figure 19:
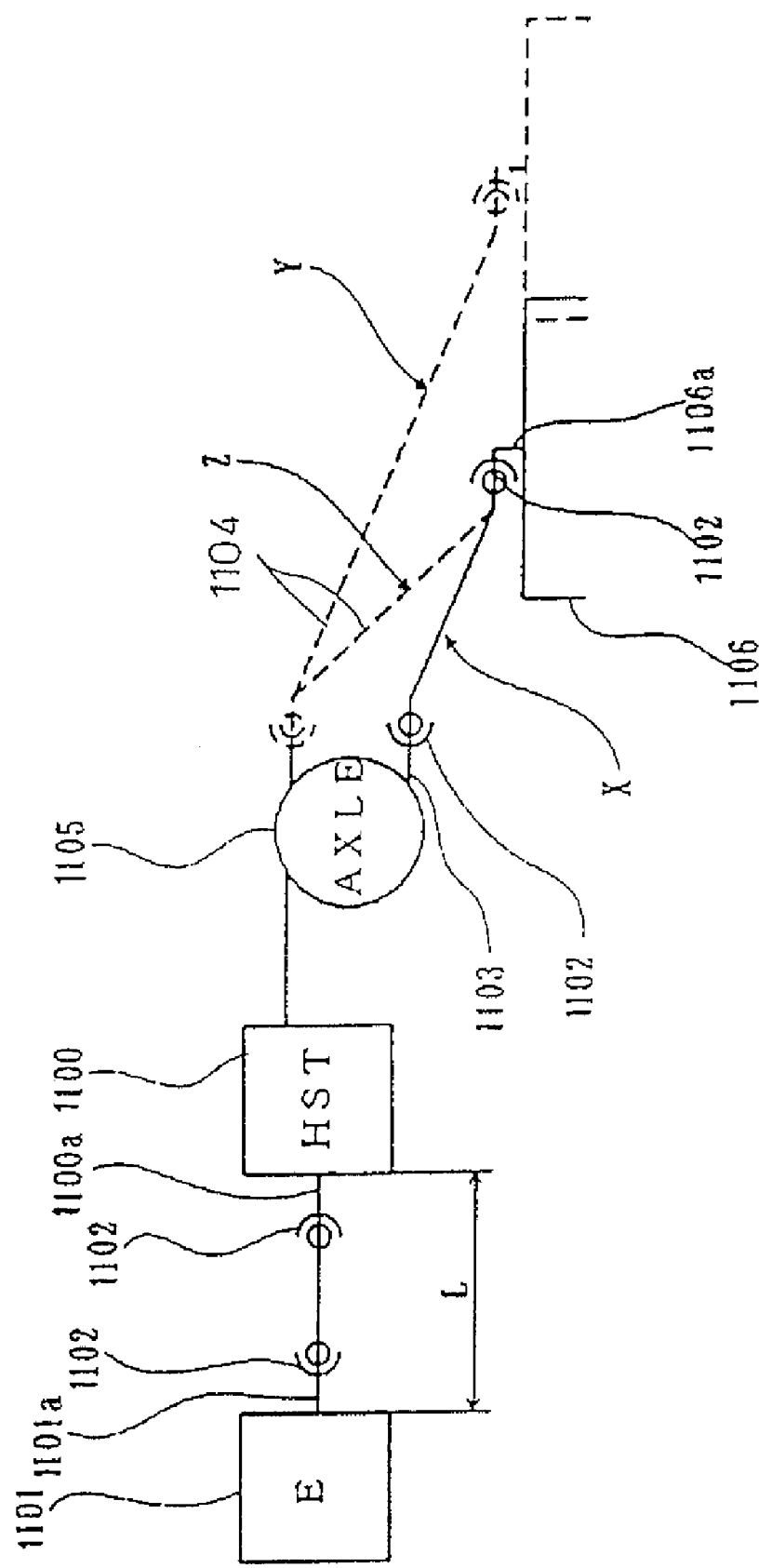
FIG. 19 is a side elevation schematically showing a conventional transmission mechanism.
Figure 20:
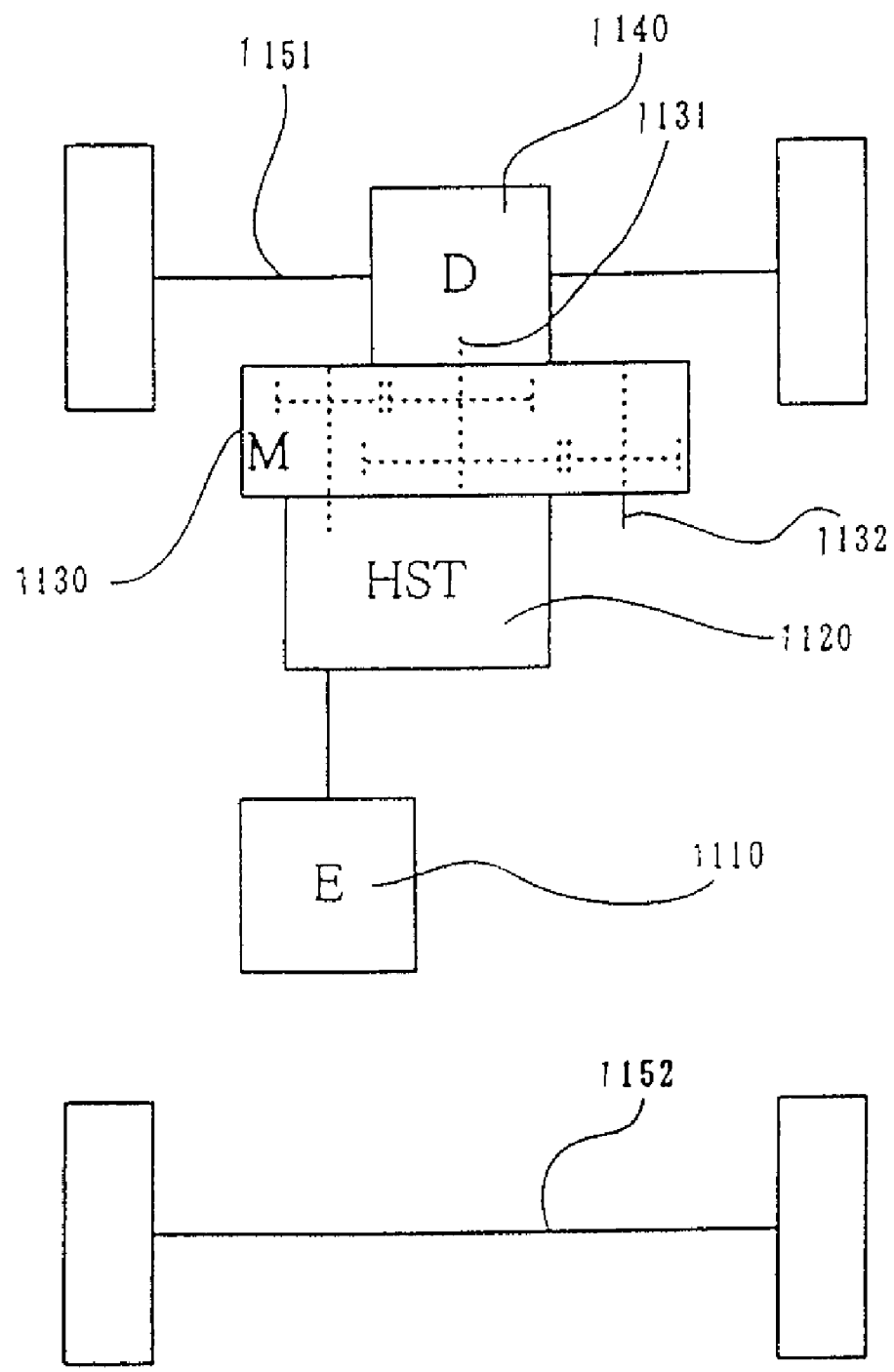
FIG. 20 is a plan view schematically showing a conventional transmission mechanism.

The present embodiment thus constructed has the following advantage. If the PTO shaft is caused to project forward from the front axle case at a position above the front axle, with the front end of the front mower positioned at the same distance from the case as in the present embodiment, the transmission shaft connecting the PTO shaft to the mower input shaft has an increased inclination (see FIG. 19, Z). The increased inclination of the transmission shaft impairs the durability of the joints of the transmission shaft and produces a louder noise, for example, when the mower is raised or lowered.

On the other hand, it is extremely difficult to cause the PTO shaft to project forward from the front axle case at a position below the front axle (see FIG. 19, X) because of the presence of the support point for a working machine lift link disposed to the front of the front axle case, making complex the PTO cooperative mechanism for dividedly deriving power from the travel power transmission path and delivering the power to the PTO shaft and resulting in a cost increase and difficult maintenance. If caused to project from a position below the lift link support point, the PTO shaft greatly diminishes the ground clearance of the transmission shaft, rendering the transmission shaft liable to contact stones or like obstacles on the terrain and further entailing the drawback that the inclination of the transmission shaft becomes excessively great when the working machine is lifted.

In contrast, the PTO shaft 41 of the present embodiment is supported on, and caused to project from, the HST housing positioned rearwardly of the front axle 120, and the shaft 41 is coupled to the pump shaft 22a by a gear transmission assembly within the HST housing 21. This simplifies the construction of the PTO operative mechanism for deriving power from the travel power transmission path and delivering the power to the PTO shaft 41, further permitting the PTO shaft 41 to be disposed in the rear of the front axle 120, whereby the overall length of the vehicle including the mower can be shortened with a decreased inclination given to the transmission shaft interconnecting the PTO shaft and the mower input shaft.

Further with the PTO shaft 41 projecting from the HST housing extension 21b in the present embodiment, the pump shaft 22a and the motor shaft 23a can be arranged in approximately the same horizontal plane, so that the engine coupled to the pump shaft 22a can be disposed at a lower position in the vehicle, consequently lowering the center of gravity of the vehicle to give improved stability to the vehicle.

Rear Wheel Output Transmission Path

Figure 10:
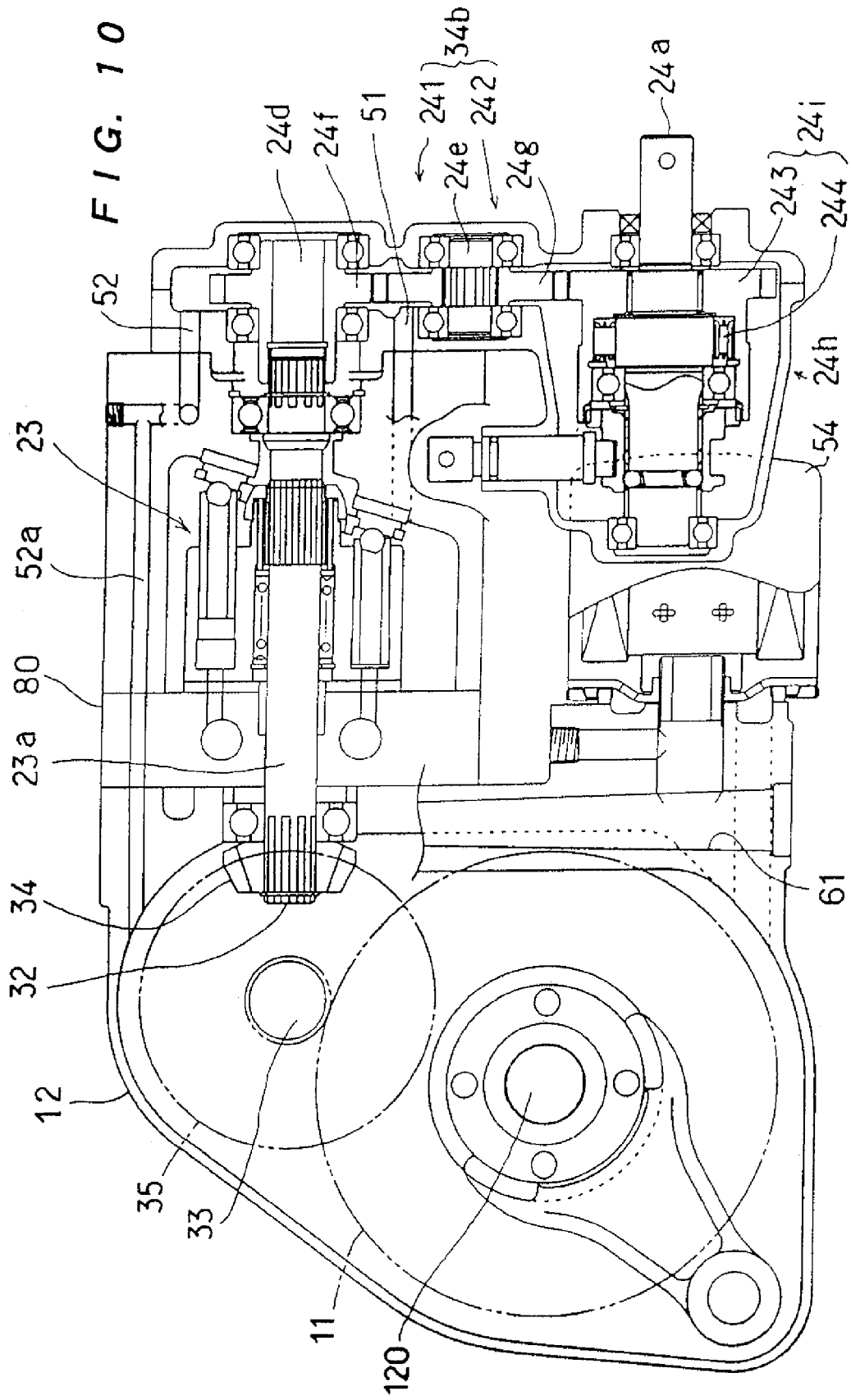
FIG. 10 is a view in section taken along the line X-X in FIG. 4.

Next, a transmission path for the rear wheel drive output shaft 24a will be described with reference to FIGS. 4 and 10. A rear wheel output unit 24 is disposed to the rear of the HST 20 at the right side thereof. The output unit 24 has a case 24b joined to the housing 21. This case has an inward portion 241 overlapping the portion of the housing rear wall which portion supports the rear end of the motor shaft, and an outward portion 242 extending rightward from the inward portion so as to be positioned externally of the housing 21 widthwise of the vehicle. The outward portion 242 has a forwardly bulging part 242a.

Supported by the case 24b are an input shaft 24d, intermediate shaft 24e and rear wheel drive shaft 24a which extend longitudinally of the vehicle and are arranged in the direction of from the inward portion 241 toward the outward portion 242. The input shaft 24d is connected at its front end to the motor shaft 23a nonrotatably about the axis. An input gear 24f is mounted on the input shaft 24d nonrotatably relative thereto. The intermediate shaft 24e carries thereon an intermediate gear 24g nonrotatable relative thereto and meshing with the input gear 24f.

On the other hand, the rear wheel drive shaft 24a has a rear end portion projecting rearward from the case 24b. The power for driving the rear wheels can be taken off from this portion. A clutch mechanism 24h is supported by the drive shaft 24a utilizing the bulging part 242a of the case. According to the present embodiment, the input gear 24f, intermediate shaft 24e, intermediate gear 24g and clutch mechanism 24h provide a cooperative mechanism for transmitting the power from the input shaft 24d to the rear wheel drive shaft 24a.

The clutch mechanism 24h comprises a one-way clutch 24i and a lock member 24j for the clutch. The one-way clutch 24i has an outer wheel 243 formed on its outer periphery with a gear meshing with the intermediate gear 24g, and a clutch element 244 provided between the outer wheel 243 and the drive shaft 24a for transmitting only an advancing force to the drive shaft 24a. On the other hand, the lock member 24j is provided on the drive shaft 24a nonrotatably and axially slidably and has a shifter 245 disengageably engageable with the outer wheel 243.

The clutch 24h prevents the rear wheels from skidding owing to a different in turning radius between the front wheel and the rear wheel during a forward drive and provides a four-wheel reverse drive. Stated more specifically, the one-way clutch 24h is actuated for forward drives, permitting the rear wheel drive shaft 24a to rotate at a higher speed than the outer wheel 243 and consequently preventing the rear wheels from skidding owing to the turning radius difference between the front and rear wheels. On the other hand, the one-way clutch 24*h* is locked by the rock member 24*j* for reverse drives, whereby the driving force for the rear wheels can be output effectively.

Further according to the present embodiment, the clutch mechanism 24*h* is installed in a vacant space available at the right side of the HST 20 and in the rear of the differential gear unit 10. The provision of the clutch mechanism 24*h* therefore leads to no increase in the size of the vehicle.

Further because the rear wheel drive shaft 24*a* is positioned rightwardly away from the motor shaft 23*a* as previously stated, the engine can be installed at a lower level. In the case where the rear wheel drive shaft 24 is disposed in alignment with the motor shaft 23*a*, the engine needs to be installed at a higher level so as to avoid interference of the transmission shaft 125 for interconnecting the drive shaft 24*a* and the rear axles 130 with the engine (see FIG. 2). The engine thus positioned at the higher level makes the vehicle greater in size and impairs running stability owing to a rise in the center of gravity of the vehicle, whereas if the drive shaft 24*a* is positioned rightwardly away from the axis of the motor shaft 23*a* as in the present embodiment, no interference occurs between the transmission shaft 125 and the engine even if the engine is installed at approximately the same level as the HST 20, consequently obviating the drawback that the vehicle becomes greater in size and impaired in running stability.

Figure 15:
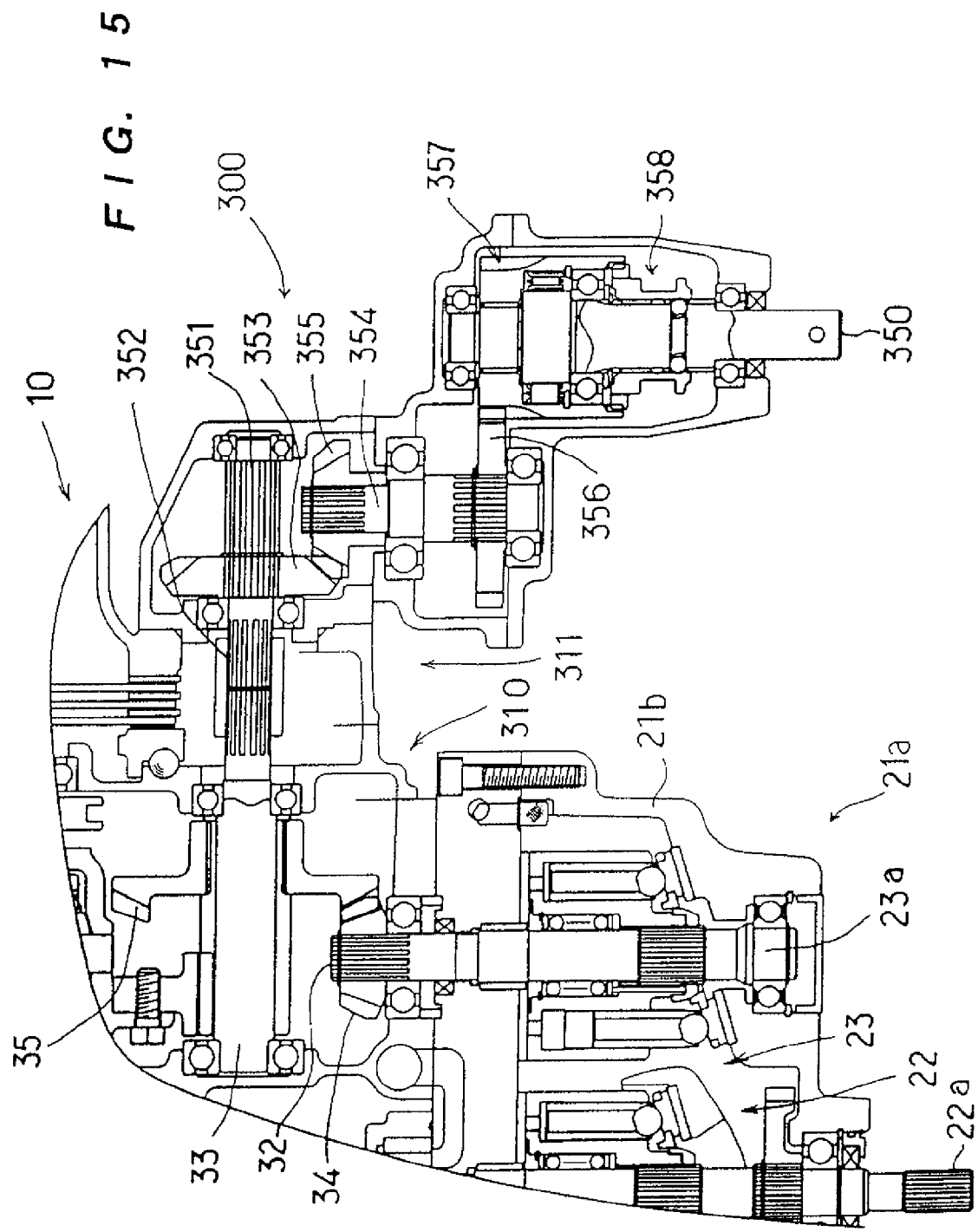
FIGS. 15 to 18 are sectional views showing modifications of the transmission mechanism shown in FIG. 4.

FIG. 15 shows the main components of a transmission path for the rear wheel output which are different in arrangement from those shown in FIG. 4. The arrangement of FIG. 15 differs from that of FIG. 4 in the following respects. In FIGS. 15 and 4, like parts are designated by like reference numerals. The illustrated casing of a transmission 300 has a main body 310 held between the differential unit 10 and the HST housing main body 21*a*, and an extension 311 extending from the main body 310 in a direction (rightward in the illustration) opposite to the HST housing extension 21*b* widthwise of the vehicle body. A first intermediate shaft 351 disposed on the same axis as the output shaft 33 is supported by the transmission casing extension 311. The first intermediate shaft 351 and the output shaft 33 are butted against each other and made nonrotatable about the axis relative to each other by a coupling member 352. A gear 353 is supported on the first intermediate shaft 351 nonrotatably relative thereto. A second intermediate shaft 354 extending longitudinally of the vehicle body is positioned to the rear of the first intermediate shaft 351 and supported by the casing extension 311. A gear 355 meshing with the gear 353 and a gear 356 disposed to the rear of the gear 355 are supported by the second intermediate shaft 354 nonrotatably relative thereto. The gear 356 is in mesh with a gear 357 supported by a rear wheel drive output shaft 350 with a one-way clutch 358 provided therebetween. Thus a power transmission mechanism for the rear wheel drive output shaft 350 is provided by the output shaft 33, first intermediate shaft 351 connected to the shaft 33 nonrotatably relative thereto, second intermediate shaft 354 coupled to the first intermediate shaft by the gears 353 and 355, gears 356, 357, and one-way clutch 358.

In the present embodiment, the one-way clutch 358 is provided between the output shaft 350 and the gear 357 so as to deliver a drive force to the rear wheels only in the case where the rear wheels are subjected to a load greater than is predetermined, for example, owing to a skid of the front wheels and to thereby prevent the skid of the rear wheels from roughing the terrain. In other words, if four-wheel drive is resorted to at all times, the rear wheels serving as steerable wheels will skid owing to the turning radius difference between the front wheel and the rear wheel when the vehicle is turned, consequently roughing the terrain. In contrast, the present embodiment incorporates the one-way clutch 358, which enables the rear wheels to drive the vehicle in the event of the rear wheels skidding while precluding such a drawback.

Further according to the present embodiment, the transmission casing extension 311 is removable from the transmission main body 310. This permits use of common parts for two-wheel drive vehicles and four-wheel drive vehicles. Stated more specifically, the transmission casing extension 311 may be additionally attached to the casing main body 310 serving as a standard part when there arises a need to take off the rear wheel driving force. This lessens the burden of stock management of parts and ensures greater ease in altering the specifications of vehicles.

The following advantage can be obtained by the foregoing arrangement wherein the front end of the motor shaft 23*a* is coupled to the differential gear unit 10 and the rear end thereof is made to project rearward from the housing 21. The transmission is indispensable if provided between the HST and the differential gear unit to dividedly provide the front wheel driving force and the rear wheel driving force within the transmission as shown in FIG. 15.

On the other hand, when the motor shaft 23*a* is adapted to deliver the front wheel driving force and the rear wheel driving force respectively from the front end and rear end thereof as shown in FIG. 4, the transmission need not always be provided if the transmission ratio is adjusted appropriately. This leads to a cost reduction and gives the vehicle higher reliability due to a decrease in the number of parts. Since the rear wheel driving force is taken off from behind the HST 20 where considerable space is available, the vehicle can be assembled with an improved efficiency. Further because the rear wheel driving force is delivered from the rear end of the motor shaft 23*a*, the connecting rod used therefor and connected to the rear axles can be shortened.

Lubricating Oil Channels

Figure 8:
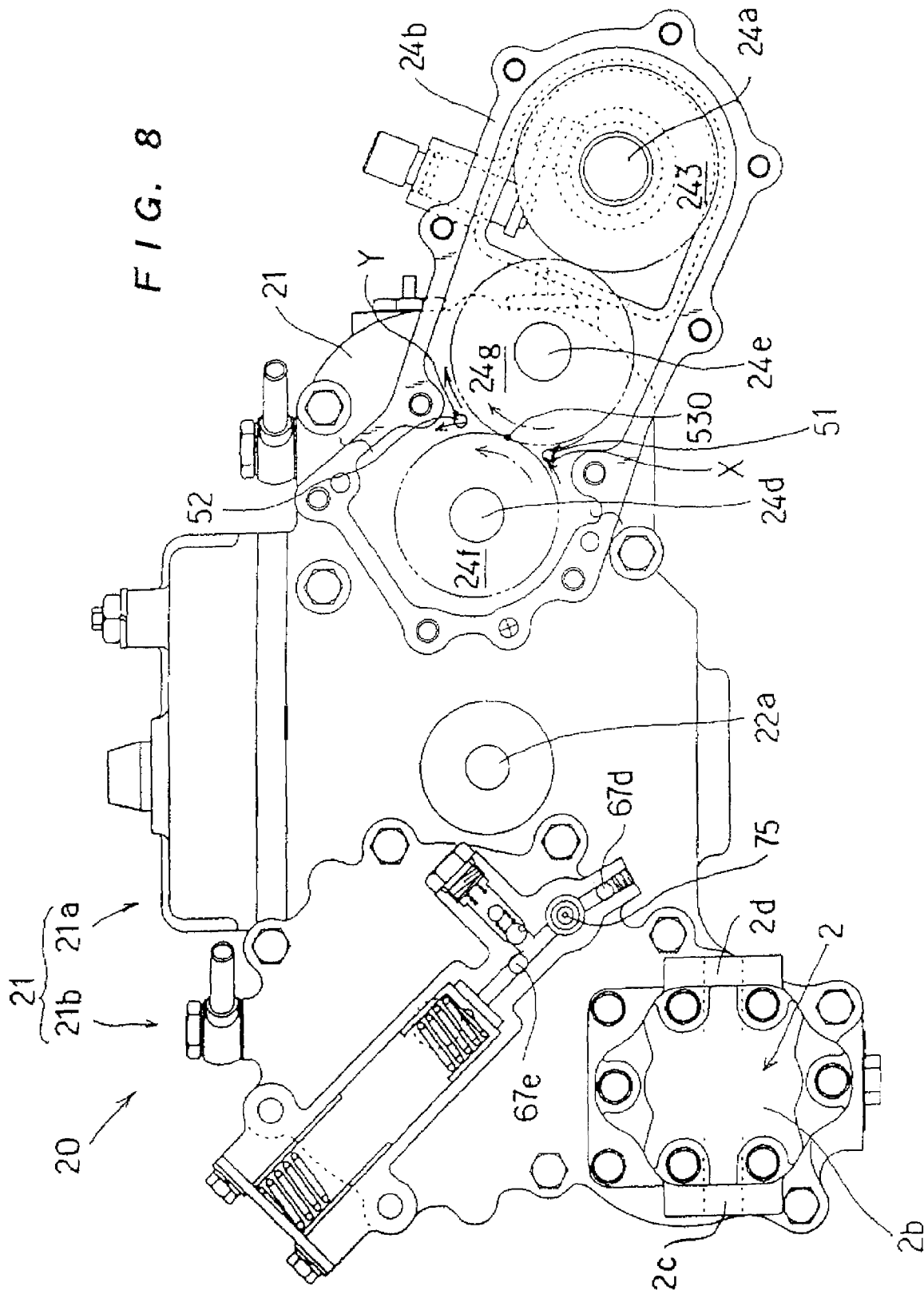
FIG. 8 is a view in section taken along the line VIII-VIII in FIG. 4.

With reference to FIG. 8, the present embodiment further has a lubricant intake channel 51 for holding the interior of the housing 21 in communication with the interior of the case 24*b*, and a lubricant discharge channel 52 for holding the interior of the case 24*b* in communication with the casing 12 for the differential gear unit.

The intake channel 51 communicates with the interior of the case 24*b* in the vicinity of the meshing point of gears in the rear wheel output unit 24 and at a position downstream from the gears providing the meshing point with respect to the directions of rotation thereof when the vehicle is driven forward. On the other hand, the discharge channel 52 communicates with the interior of the case 24*b* in the vicinity of the meshing point and at a position upstream from the gears providing the meshing point with respect to the directions of rotation thereof. According to the present embodiment, in the vicinity of the meshing point 530 of the input gear 24*f* and the intermediate gear 24*g* as shown apparently in FIG. 8, the intake channel 51 and the discharge channel 52 are caused to communicate with the case 24*b* respectively at a position downstream from and at a position upstream from these gears with respect to the directions of rotation thereof for forward driving. This makes the lubricating oil in the rear wheel drive unit 24 serviceable also as the hydraulic fluid for the HST 20 while inexpensively and effectively preventing the rise in the temperature of the HST hydraulic fluid. The reason is as follows.

First, the flow of oil within the case 24*b* in the vicinity of the meshing point will be considered. For example, assuming that the input gear 24*f* rotates counterclockwise in FIG. 8 for forward travel of the vehicle, the intermediate gear 24g meshing with the gear rotates clockwise. Accordingly, the rotation of the input gear 24f and the intermediate gear 24g causes the oil to flow inwardly of the case 24b (as indicated by the arrow X in FIG. 8) at the downstream side of the gears 24f, 24g with respect to the directions of rotation thereof. At the upstream side of the gears 24f, 24g with respect to the directions of rotation thereof, on the other hand, the oil flows outwardly of the case 24b (as indicated by the arrow Y in FIG. 8) with the rotation of the gears 24f, 24g. If the intake channel 51 and the discharge channel 52 are positioned at the downstream side and at the upstream side, respectively, with respect to the directions of rotation as described above, it therefore becomes possible for the pumping action afforded by the rotation of the gears 24f, 24g to efficiently introduce the hydraulic fluid from the housing 21 into the case 24b and to efficiently discharge the lubricating oil from the case 24b. The channels are thus positioned based on the rotation for the forward travel because the vehicle is driven forward usually for longer periods of time than reversely.

Although the positions where the intake channel 51 and the discharge channel 52 communicate with the case 24b are determined based on the input gear 24f and the intermediate gear 24g according to the present embodiment, the communication positions may of course be determined based on any of the gears within the case 24b. For example, the intake channel 51 can be disposed downstream from the gears 24f, 24g with respect to the directions of rotation thereof, and the discharge channel 52 upstream from the intermediate gear 24g and the outer wheel 243 with respect to the directions of rotation thereof.

To achieve an improved intake-discharge efficiency, it is desire that the intake channel 51 be opened to the case 24b at the upper side of the meshing point of the gears, and that the discharge channel 52 be opened to the case 21 at the lower side of the meshing point of the gears. This facilitates the flow of oil from the housing 21 into the case 24b, further facilitating the discharge of oil from an upper portion of the differential gear unit 10 through an oil channel 52a formed in the upper wall of the housing (see FIG. 10), consequently making it possible to effectively use the oil discharged from the case 21 as the lubricant for the differential gear unit.

The discharge channel 52, which is in communication with the casing 12 of the differential gear unit, can alternatively be made to communicate with the housing 21. In this case, the oil taken into the case 24b from the housing 21 and given a higher temperature by being used as lubricant within the limited space of the case 24b is returned to the HST 20 again, consequently raising the temperature of the oil within the housing 21. The rise in the oil temperature would entail a pressure variation of the HST hydraulic fluid but is avoidable by providing a device for cooling the oil in the housing 21.

According to the present invention, however, the oil taken in from the housing 21 and used as the lubricant is discharged to the differential gear unit 10, then drawn off from the unit 10 by the charge pump 55 through a filter 54 (see FIGS. 9 to 11) and returned to the hydraulic circuit of the HST 20. The oil becoming heated to a high temperature by being used as the lubricant for the rear wheel output unit is thus recycled, whereby the oil can be cooled spontaneously. The present embodiment therefore need not be provided with the cooling device.

Figure 16:
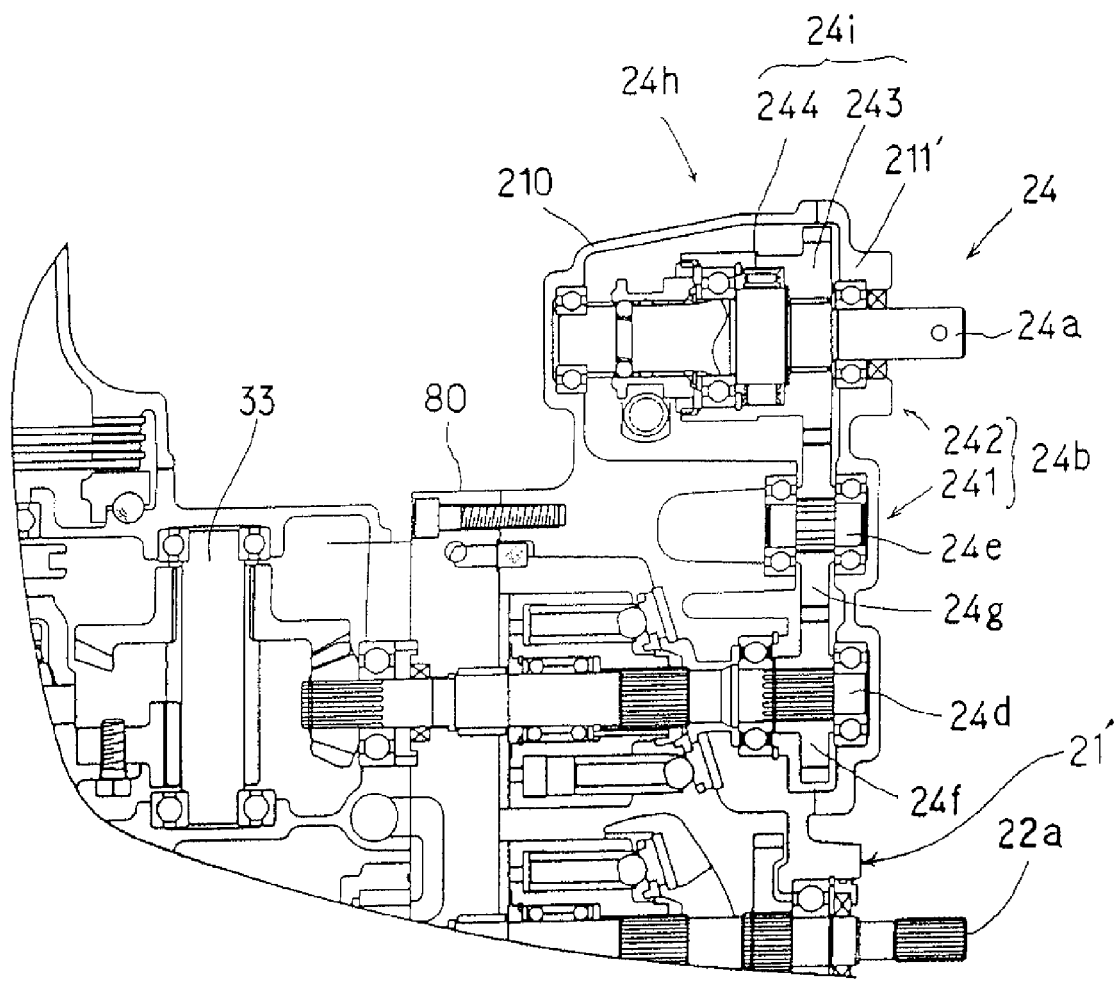

The rear wheel output unit 24 is housed in the case 24b which is removably attached to the HST housing 21 according to the present embodiment, whereas the invention is not limited to the embodiment. For example as shown in FIG. 16, the rear wheel output unit 24 can alternatively be accommodated in a space defined by a bulging portion 210' formed at the right side of the HST housing and a closing member 211' removably attached to the housing 21'. The bulging portion 210' formed on the HST housing and the closing member 211' of this modification correspond to the case 24b of the present embodiment.

The relationship between the left side and the right side involved in the present embodiment can of course be reversible.

Details of PTO Unit

The PTO unit 40 comprises the PTO shaft 41, hydraulic clutch 45 for on/off-controlling the PTO shaft, charge pump 55 for supplying a hydraulic fluid to the clutch, and hydraulic circuit for connecting the clutch 45 to the charge pump 55.

The PTO shaft 41 is supported by the front wall of the housing extension 21b and the closing member 21c to extend longitudinally of the vehicle, and has a front end projecting forward from the front wall of the extension 21b. As shown in FIG. 11, the PTO shaft 41 has an oil channel 41a extending axially thereof for causing a rear end portion supported by a bearing on the closing member 21c to communicate with a region supporting the clutch 45. The oil channel 41a has an opening in the outer surface of the shaft 41 in the clutch supporting region.

With reference to FIG. 5, the hydraulic clutch 45 comprises a drive member 43 supported by the PTO shaft 41 rotatably but axially nonslidably and connected to the gear 22c, a driven member 42 supported by the PTO shaft, and a biasing member 44 for biasing these members away from each other.

The drive member 43 has a plurality of friction plates 43a loosely fitted around the PTO shaft 41, and a gear 43b non-rotatably attached to the plates and meshing with the gear 22c of the hydraulic pump 22. On the other hand, the driven member 42 has a main body 42a in the form of a disk and supported by the PTO shaft 41 nonrotatably and axially nonslidably, a second member 42b positioned between the main body 42a and the driven member 43 and supported by the main body 42a nonrotatably but axially slidably. The main body 42a is formed with an oil channel 42c for causing the oil channel 41a formed in the PTO shaft 41 to communicate with the second member 42b. The second member 42b has a plurality of friction plates 42d engageable with the friction plates 43a.

The present embodiment further has a brake mechanism 46 provided in the housing extension 21b. As shown in FIG. 5, the brake mechanism 46 comprises brake members 46a supported by the front wall of the housing extension 21b, brake disks 46b positioned between the brake members 46a and the main body 42a and nonrotatably supported by the PTO shaft 41, and a coupling member 46c positioned between the brake disks 46b and the main body 42a and nonrotatably supported by the PTO shaft 41 so as to be slidable axially of the shaft 41 with the sliding movement of the second member 42b. The brake mechanism 46 thus constructed is released when the clutch 45 is engaged, or actuated when the clutch 45 is disengaged. The operation of the clutch 45 and the brake mechanism 46 will be described later in detail.

At the front side of the hydraulic block 80, the charge pump 55 has a casing 66 (FIG. 12) surrounding the forward projection of the pump shaft 22a liquid-tightly as shown in FIG. 5. The pump 55 is adapted to effect a pumping action by the rotation of the pump shaft 22a.

Figure 12:
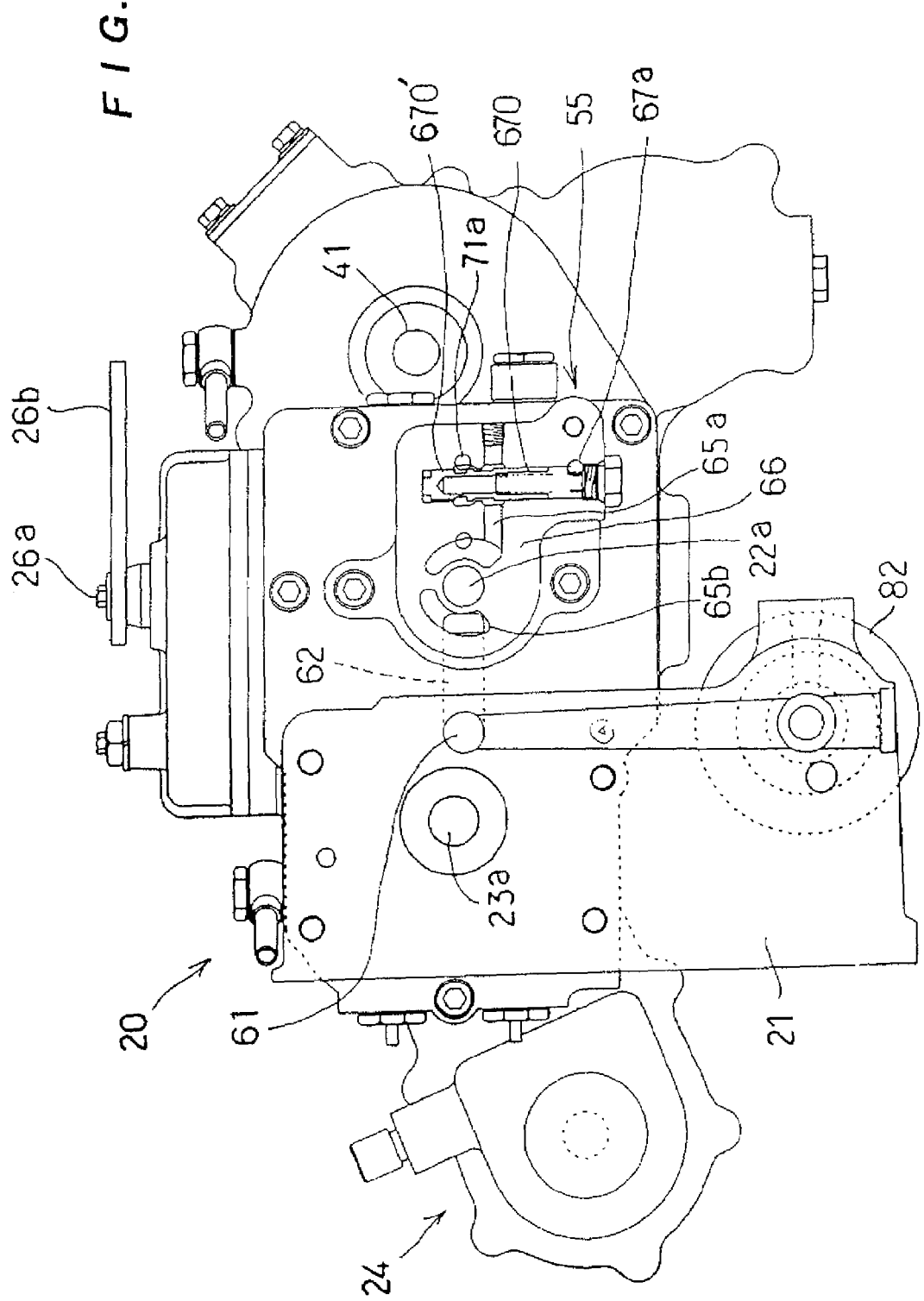
FIG. 12 is a view in section taken along the line XII-XII in FIG. 4.

FIG. 12 is a view in section taken along the line XII-Xii in FIG. 4. As shown apparently in FIG. 12, the charge pump 55 has an intake circuit 65b and a discharge circuit 65a.

The intake circuit 65b has a second suction passageway 62 (see FIGS. 5 and 12), and a first suction passageway 61 formed in a thick wall portion of casing rear wall of the differential gear unit 10 so as to communicate with the second suction passageway 62. The first passageway 61 communicates with the interior of the casing of the differential gear unit 10 through an oil filter 82 (see FIGS. 3 and 10). Through this arrangement, the oil within the casing of the gear unit 10 is filtered by the oil filter 82, then passed through the first and second passageways 61, 62 and fed to the charge pump 55.

The discharge circuit 65a of the charge pump 55 is formed in the casing 66 and provided with a flow dividing member 670 (See FIG. 5) for dividedly supplying the discharged oil to the HST 20 and the hydraulic clutch 45. A pressure reduction valve is used as the flow dividing member 670 in the present embodiment. The reduction valve supplies hydraulic fluid of predetermined pressure to the HST 20 and supplies drain oil to the clutch 45. Indicated at 670' in the drawing is a relief valve for maintaining the discharge circuit 65a of the charge pump at a constant value.

The hydraulic fluid is supplied to the clutch 45 through an oil channel 67a provided at the drain side of the pressure reduction valve 670. The hydraulic fluid is supplied to the HST 20 through an oil channel 71a provided at the secondary side of the pressure reduction valve 670.

FIG. 11 is a view in section taken along the line XI-XI in FIG. 4. As shown apparently in FIG. 11, the oil channel 67a communicates with an oil channel 67d formed in the closing member 21c via an oil channel 67b formed in the hydraulic block 80 and an oil channel 67c formed in the lower wall of the housing 21.

Thus, the hydraulic fluid supply channel from the charge pump 55 to the closing member 21c is so formed as to extend through the housing 21. This effectively prevents the leakage of oil from the supply channel, further giving improved durability to the supply channel. If piping is provided externally of the housing for supplying the hydraulic fluid from the charge pump 55 to the closing member 21c, the piping is left exposed and likely to become damaged or flawed, whereas when the supply channel is made to extend through the housing 21 as in the present embodiment, such a drawback is avoidable.

The oil channel 67d is made to extend into an oil channel 67e or oil channel 72b selectively by a directional selecting valve 75. Thus, the oil channel 67d is caused to communicate with one of the oil channels 67e and 72b selectively by the selecting valve 75. A solenoid valve is used as the directional selecting valve in the present embodiment.

As apparently shown in FIG. 11, the oil channel 67e has a downstream end extending to the rear end of the PTO shaft 41 and communicating with the oil channel 41a formed in the shaft 41, the shaft 41 being supported by the bearing on the closing member 21c. Accordingly, when the oil channel 67d is caused to communicate with the oil channel 67e by the directional selecting valve 75, the oil discharged from the charge pump 55 acts on the hydraulic clutch 45 by way of the oil channels 41a and 42c. On the other hand, the oil channel 72b has a downstream end communicating with the interior of the housing 21. Accordingly, when the oil channel 67d is caused to communicate with the oil channel 72b by the directional selecting valve 75, the oil discharged from the charge pump 55 is sent into the housing 21.

The oil channel 67e is further provided with a hydraulic shock absorbing member 69. According to the present embodiment, an accumulator is used as the shock absorbing member 69. As seen in FIG. 11, the accumulator comprises an oil channel 69a having an upstream end in communication with the oil channel 67e and a downstream end in communication with the interior of the housing 21, a slide member 69b slidable along the oil channel 69a, and a biasing member 69c for biasing the slide member 69b toward the upstream end of the oil channel 69a. The shock absorbing member 69 thus constructed prevents the hydraulic fluid from the charge pump 55 from acting on the hydraulic clutch 45 abruptly to ensure smooth engagement of the clutch 45.

Stated more specifically, when the hydraulic fluid from the charge pump 55 is sent into the oil channel 67e as selected by the directional selecting valve 75, the fluid flows toward the clutch 45 and also into the oil channel 69a, pushing the slide member 69b against the biasing force of the biasing member 69c. The slide member 69b is slidingly moved to a position where the pressure of the fluid in the oil channel 68e is brought into balance with the biasing force of the member 69c and comes to a halt at this position. The pressure of the hydraulic fluid acting on the clutch 45 through the oil channel 67e will rise gradually while the slide member 69b is moved to the position of balance. Thus the provision of the shock absorbing member 69 prevents the hydraulic fluid of high pressure from abruptly acting on the clutch 45, with the result that the clutch 45 can be engaged smoothly.

With the present embodiment described, the aforementioned hydraulic circuit is provided by the discharge circuit 65a formed in the casing 66 of the charge pump 55, flow dividing member 670 provided in the discharge circuit 65a, oil channel 67a communicating at its upstream end with the drain side of the flow dividing member 670, oil channel 67b formed in the hydraulic block 80 in communication with the oil channel 67a, oil channel 67c formed in the lower wall of the housing 21 in communication with the oil channel 67b, oil channel 67d formed in the closing member 21c in communication with the oil channel 67c, directional selecting valve 75 provided in the oil channel 67d, oil channel 67e selectively brought into or out of communication with the oil channel 67d by the selecting valve, oil channel 41a formed in the PTO shaft 41 in communication with the oil channel 67e, and oil channel 42c formed in the main body 42a in communication with the oil channel 41a.

Figure 14:
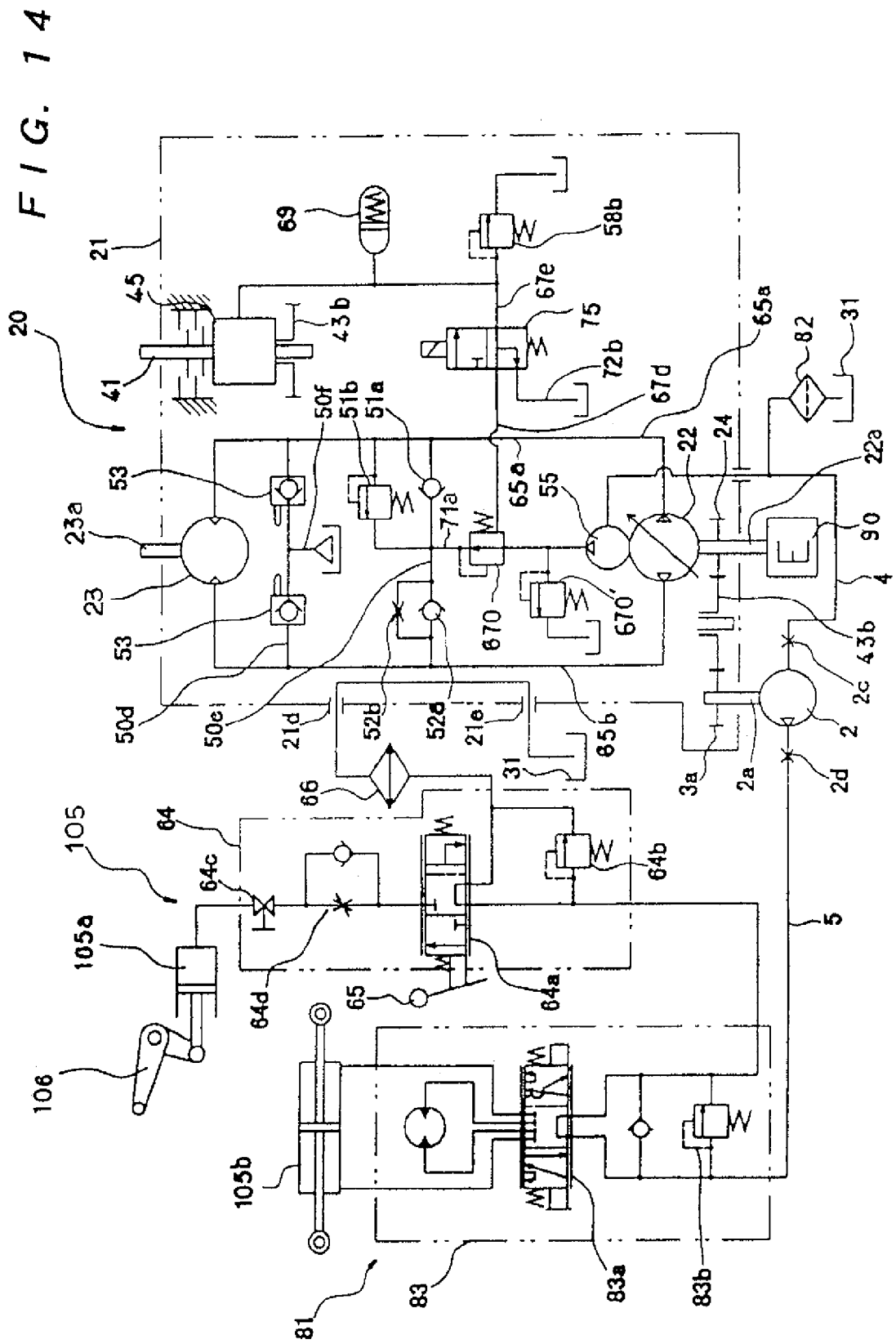
FIG. 14 is a hydraulic circuit diagram of the transmission mechanism shown in FIG. 4.

Next, a description will be given of the operation of the hydraulic clutch 45 and the brake mechanism 46. FIG. 14 is a hydraulic circuit diagram of the present embodiment. With reference to FIG. 14, the discharge circuit 65a of the charge pump is maintained at a constant pressure by the relief valve 670'. The oil supply channel 71a leading to the HST 20 has its pressure controlled by the pressure reduction valve 670. On the other hand, the drain oil of the valve 670 flows through the oil channel 67a and then through the oil channel 67b and oil channel 67c which communicate with the channel 67a and flows into the oil channel 67d formed in the closing member 21c (see FIGS. 4 and 11). As previously stated, the oil channel 67d is divided into the oil channel 67e and the oil channel 72b by the directional selecting valve 75.

When a driving force is to be delivered from the PTO shaft 41, the oil channel 67d is brought into communication with the oil channel 67e by the valve 75. This causes the oil discharged from the charge pump 55 to pass through the oil channel 67e, the oil channel 40a in the PTO shaft 41 and the oil channel 42c in the main body 42a and act on the hydraulic clutch 45. The oil sent out from the oil channel 42c presses the second member 42b against the drive member 43 against the biasing force of the biasing member 44 as apparently shown in FIG. 11, whereby the driven friction plates 42d of the second member 42b are brought into engagement with the drive friction plates 43a of the drive member 43. Since the drive member 43 is coupled to the gear 22c nonrotatably supported by the pump shaft 22a as previously described, a driving force is delivered from the drive member 43 to the second member 42b by virtue of the engagement of the friction plates of the two members. Since the second member 42b is made nonrotatable relative to the main body 42a, which is nonrotatable relative to the PTO shaft 41, the driving force delivered to the second member 42b is transmitted to the PTO shaft 41. In this way, the driving force is output from the PTO shaft 41.

In the case where the driving force is thus output from the PTO shaft 41, with the hydraulic clutch engaged, the brake mechanism 46 is off. Stated more specifically, when the second member 42b is slidingly moved rearward (rightward in FIG. 11) against the force of the biasing member 44, the coupling member 36c is also slidingly moved rearward with this movement, consequently producing no braking force between the brake member 36a and the brake disk 36b and releasing the brake mechanism 36.

In the case where no driving force is to be output from the PTO shaft, on the other hand, the oil channel 67d is caused to communicate with the oil channel 72b by the directional selecting valve 75, thereby permitting the oil discharged from the charge pump 55 to return to the interior of the housing 21 through the oil channel 72b. The clutch 45 consequently blocks the power, and the brake mechanism 46 is actuated. Since no oil from the charge pump 55 acts on the clutch 45, the second member 42b is slidingly moved forward (leftward in FIG. 11) by the force of the biasing member 44. Accordingly, the driven friction plates 42 are brought out of engagement with the drive friction plates 43b, thereby interrupting power transmission from the drive member 43 to the driven member 42. On the other hand, the forward movement of the second member 42b causes the coupling member 46c to press the brake disk 46b against the brake member 46a, producing frictional resistance between the member 46a and the disk 46b to actuate the brake mechanism 46.

With the present embodiment, the PTO shaft 41 in rotation can be brought to a halt by the brake mechanism 46 upon disengagement of the hydraulic clutch 45. When the transmission of power to the PTO shaft 41 in rotation is cut off by the clutch 45 in the absence of the brake mechanism 46, the PTO shaft 41 fails to stop rotating immediately owing to a force of inertia. Accordingly, a mower or the like will be held in rotation despite the disengagement of the clutch 45. This drawback is avoidable by the provision of the brake mechanism 46, which brakes the PTO shaft 41 simultaneously with the interruption of power transmission to the PTO shaft 41.

In addition to the various advantages described, the following advantages are available by the PTO unit 40 thus constructed. In vehicles wherein the power from a drive source installed in the vehicle body is transmitted to a travel device and a PTO unit via an HST 20 disposed at the front side of the drive source, the PTO unit described comprises the PTO shaft 41, hydraulic clutch 45, charge pump 55 and hydraulic circuit. The charge pump 55 is provided at the front side of the HST 20, and the PTO shaft 41 and the clutch 45 are accommodated in the housing extension 21b of the HST 20. This arrangement provides a longitudinal distance between the drive source and the HST while shortening the overall length of the vehicle, further permitting provision of the PTO shaft 41 at the rear side of the vehicle body. The PTO shaft 41 as positioned toward the rear makes it possible to diminish the inclination angle of the transmission shaft interconnecting the PTO shaft 41 and the work device such as mower while reducing the overall length of the vehicle including the work device. This obviates an increase in the noise to be produced by the joints of the transmission shaft and impairment of the durability of the joints.

Further because the flow dividing member 670 and the directional selecting member 75 constituting the hydraulic circuit are arranged in the charge pump casing 66 and the closing member 21c, respectively, the oil channels around these members can be formed easily. The casing 66 and the closing member 21c are smaller than the housing 21 or hydraulic block 80 and can therefore be bored with greater ease than the housing 21 or block 80.

Figure 17:
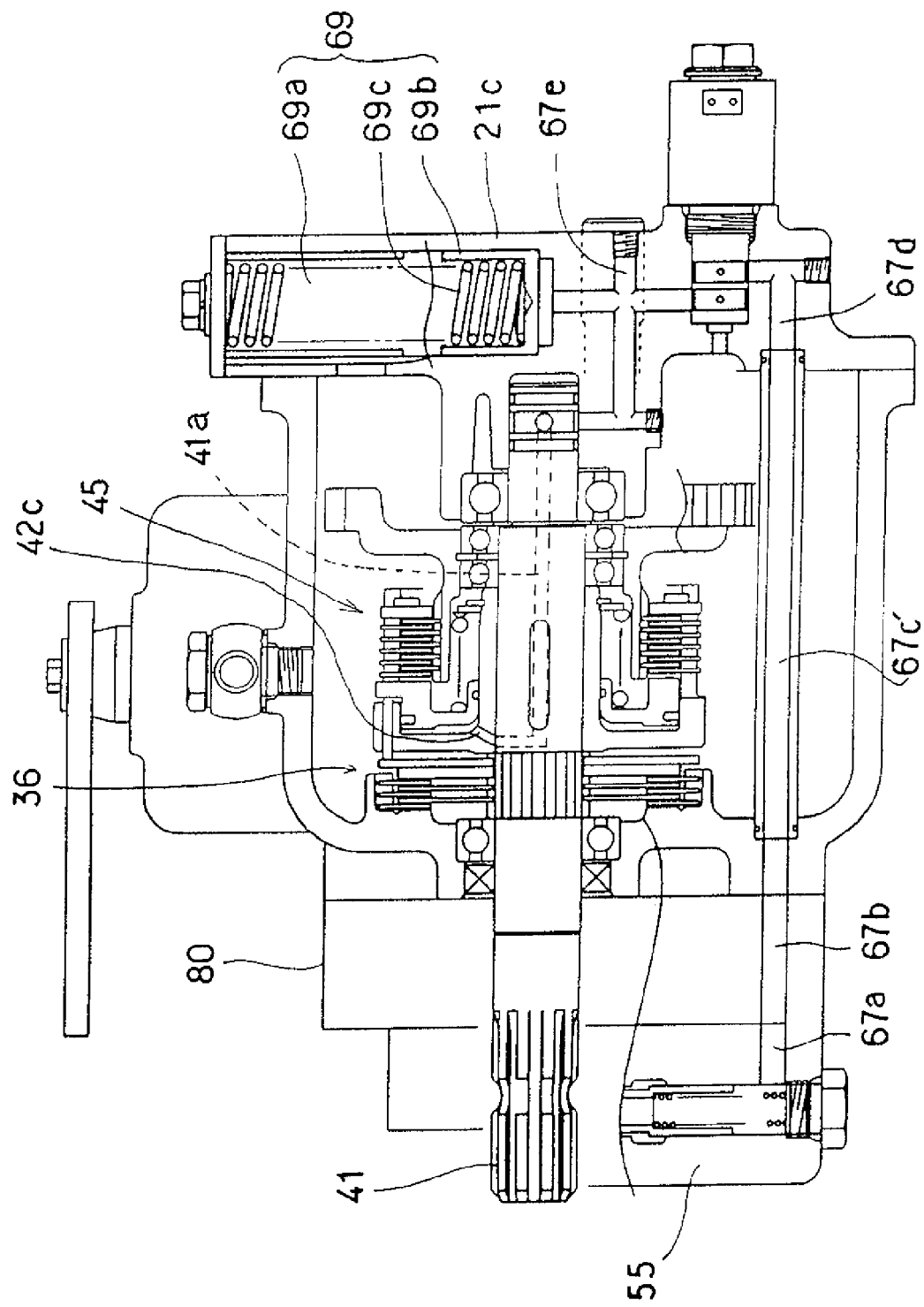

With the present embodiment, the oil channel 67c is formed by boring the housing lower wall, whereas a pipe 67c' can alternatively be inserted through the housing 21 as seen in FIG. 17.

Although the present embodiment has been described with reference to a case wherein the PTO shaft is made to project forward, the shaft can be projected rearward.

Further relationship between the left and the right involved in the present embodiment can of course be reversed.

Pressure Oil Supply System

The preferred embodiment of pressure oil supply system according to the invention will be described below with reference to the accompanying drawings. The present embodiment, i.e., pressure oil supply system 1, is adapted, for example, for use in the vehicle of FIG. 1 which comprises a hydraulic device having its operation controlled with pressure oil and which is so constructed that the power from a drive source 90 installed in the vehicle body is transmitted to drive axles 120 via an HST 20 disposed closer to longitudinal one side of the vehicle than the drive source and via a differential gear unit 10 coupled to the HST at one side thereof toward the longitudinal side. The system serves to supply the pressure oil to the hydraulic device. With the present embodiment, the HST 20 is coupled to the differential gear unit 10, with the hydraulic block (center section) 80 provided therebetween.

The following description will be given with reference to the front mount mower tractor shown in FIG. 1 and already described, as the vehicle 100.

Figure 7:
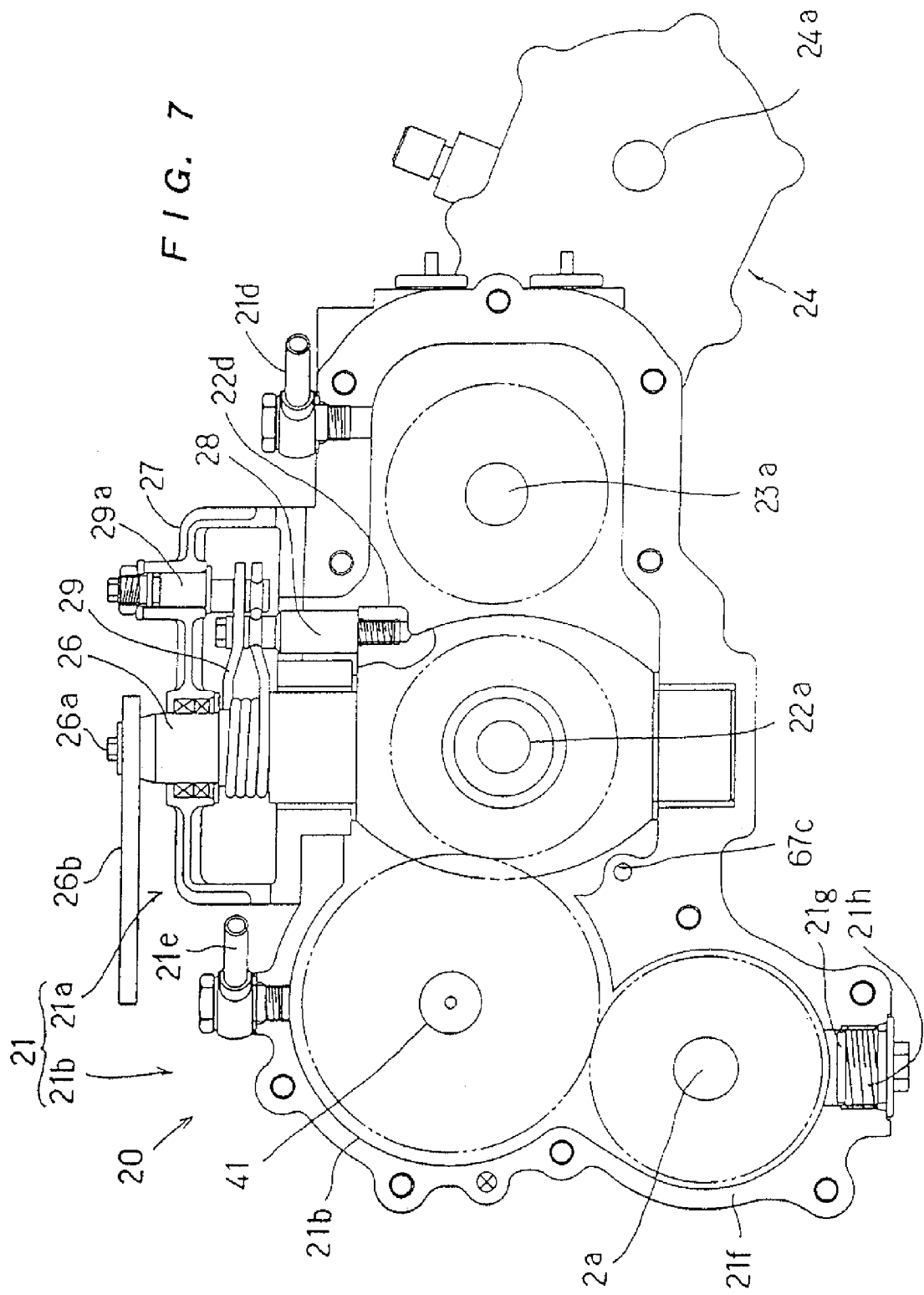
FIG. 7 is a view in section taken along the line VII-VII in FIG. 4.

The construction of the HST, etc., which has already been described, will be further described in detail. At least one of the HST pump 22 and the HST motor 23 of the HST is of the variable displacement type which includes a movable swash plate for giving a variable discharge rate. With the present embodiment, the HST pump 22 is of the variable displacement type having a movable swash plate 22d, while the HST motor 23 is of the fixed displacement type as shown in FIGS. 5 and 7. The plate 22d is coupled to the speed change pedal 112 disposed in the vicinity of the driver's seat, by means of an interlocking mechanism. As seen in FIG. 7, the interlocking mechanism comprises a rotary shaft 26 supported by the housing main body 21 rotatably about its axis and having an upper end extending upward through the top of a cover 27 provided over the upper surface of the housing main body 21a, a connecting member (not shown) for connecting the arm 26b to the upper end of the shaft 26, and an arm 28 provided inside the cover 27 and having one end connected to the movable swash plate 22d and the other end connected to the shaft 26. Inside the cover 27, the arm 28 is connected to the shaft 26 by a torque spring 29 wound around the shaft 26. The torque spring 29 serves as a return spring for biasing the swash plate 22d toward a neutral position when the plate 22d is inclined in a direction. According to the present embodiment, the spring 29 is enclosed with the cover 27 and therefore free from dust or the like, while the spring 29 is also protected against corrosion. Indicated at 29a in the drawing is an eccentric pin for finely adjusting the neutral position of the movable swash plate 22d.

The pressure oil supply system 1 of the present embodiment will be described next. FIGS. 7 and 8 are a view in section taken along the line VII-VII and the line VIII-VIII in FIG. 4, respectively.

The pressure oil supply system comprises a hydraulic pump 2 having a drive shaft 2*a* and a pump case 2*b*. The drive shaft 2*a* is supported by a lower bulging portion 21*f* of the housing extension 21*b*, with one end thereof projecting outward from the housing (see FIG. 7). The bulging portion 21*f* has a bottom positioned at a lower level than that of the housing main body. The bulging portion 21*f* is internally provided with a magnet member 21*g*. According to the present embodiment, the bottom wall of the bulging portion 21*f* is formed with a bore communicating with the outside and openably closed with a drain plug 21*h*. The magnet member 21*g* is supported by the plug at the portion thereof facing the interior of the housing 21.

The pump case 2*b* is attached to the housing 21 so as to liquid-tightly surround the outwardly projecting end of the drive shaft 2*a*. The pump case 2*b* has an intake port 2*c* and a discharge port 2*d* (FIG. 8). The hydraulic pump 2 thus constructed performs a pumping action by the rotation of the drive shaft 2*a* to draw oil in through the intake port 2*c* and supply the pressure oil via the discharge port 2*d*.

The pressure oil supply system 1 further comprises a cooperative mechanism 3 (See FIG. 5) for dividedly transmitting to the drive shaft 2*a* the driving force delivered from the drive source to the pump shaft 22*a*, an intake line 4 (See FIG. 14) having one end communicating with the interior of the casing 31 of the differential gear unit and the other end in communication with the intake port 2*c* of the pump case, and a discharge line 5 having one end communicating with the discharge port 2*d* and the other end communicating with the hydraulic device.

As shown in FIG. 5, the cooperative mechanism 3 has a pump drive gear 3*a* nonrotatably supported by the drive shaft 2*a* within the housing 21. The pump gear 3*a* is in mesh with the gear of the drive member 43. Thus according to the present embodiment, the cooperative mechanism 3 is provided by the output gear 22*c* supported on the pump shaft 22*a*, the gear 43*b* of the drive member 43 supported by the PTO shaft 41, and the pump drive gear 3*a* supported by the drive shaft 2*a*. The output gear 22*c* can be made to mesh with the pump drive gear 3*a* directly to provide the cooperative mechanism 3. With the present embodiment, the cooperative mechanism 3 is of the gear type, but the invention is not limited to this type; sprockets and a chain, or a belt is usable for the cooperative mechanism, which can therefore be of various types.

The following advantages are available by attaching the hydraulic pump 2 to the housing 21 in this way. With the conventional system wherein the hydraulic pump is attached to the drive source, and the differential gear unit casing serving as an oil tank, the distance between the pump and the casing becomes increased, consequently entailing the problem of offering greater piping resistance to the intake line to reduce the operation efficiency of the pump. The conventional system further requires the use of a flexible tube or the like for the intake line and the discharge line of the hydraulic pump to absorb the vibration difference between the pump additionally provided on the drive source and the casing, hence the problem of resulting in a cost increase.

According to the present embodiment, the hydraulic pump 2 is attached to the housing 21, whereby the distance between the hydraulic pump 2 and the casing 31 can be shortened to effectively prevent the impairment of the operation efficiency of the pump. Further because the housing 21 is connected to the casing 31, no vibration difference occurs between the pump 2 and the casing 31 unlike the conventional arrangement, consequently eliminating the need to use a flexible tube or the like for the intake line 4 and the discharge line 5 to achieve a cost reduction.

The hydraulic pump 2 can be attached to the rear wall of the housing 21 as an advantage. The reason is that while a space is usually available between the housing 21 and the drive source 90, the hydraulic pump 2, if attached to the side wall of the housing 21, becomes projected widthwise of the vehicle to entail the likelihood that the pump 2 will come into contact with other article during driving.

Figure 13:
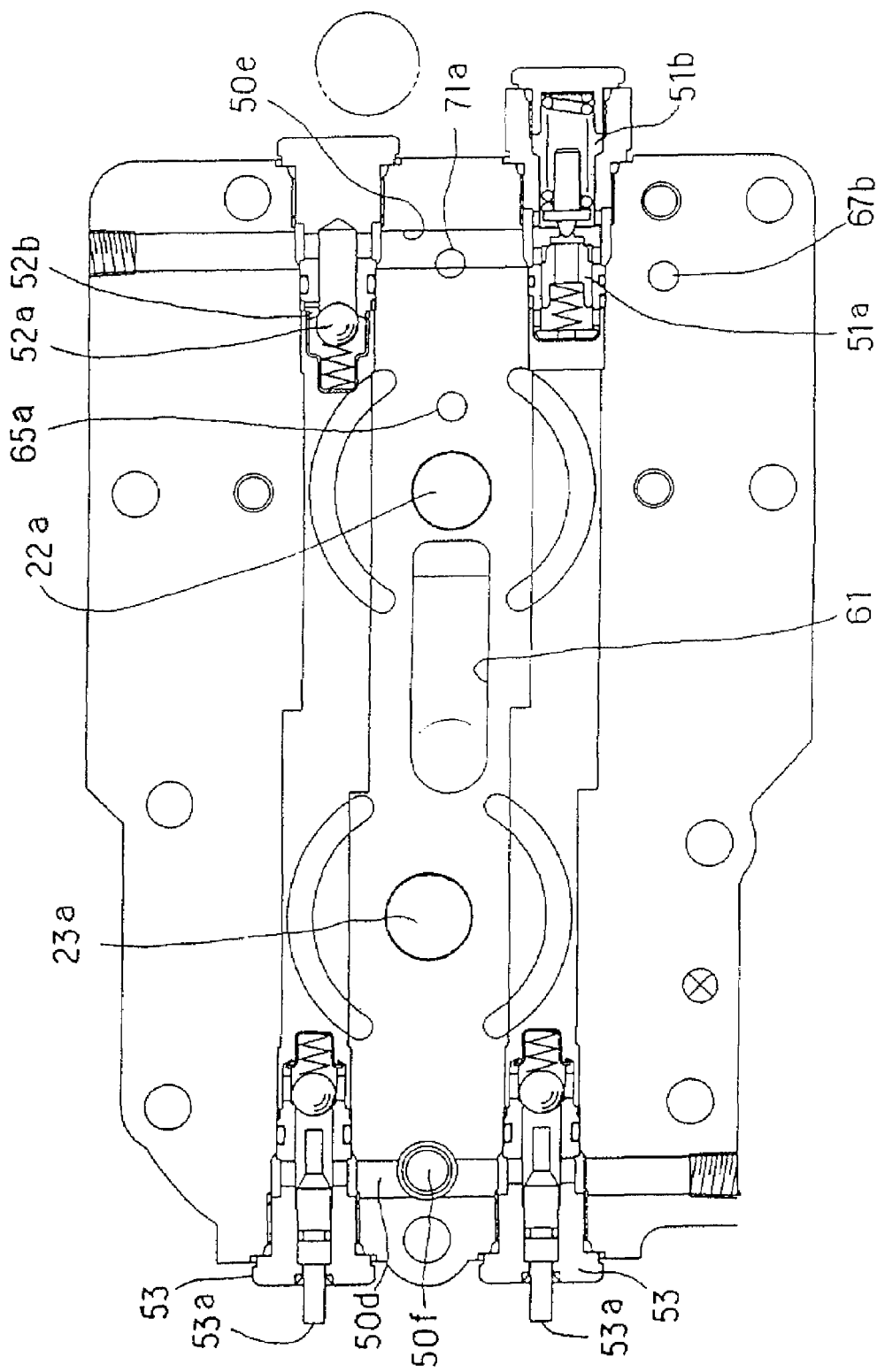
FIG. 13 is a view in section taken along the line XIII-XIII in FIG. 5.

A description will be given of the hydraulic circuit of the vehicle 100. FIG. 14 is a hydraulic circuit diagram of the vehicle, and FIG. 13 is a view in vertical section of the hydraulic block 80.

The hydraulic circuit of HST 20 will be described first. As illustrated, the LIST pump 22 and the HST motor 23 are connected into a closed circuit by a pair of oil channels which are given a high pressure and a low pressure, respectively, when the vehicle is driven forward. (The channels will hereinafter be referred to as the "high-pressure line" and the "low-pressure line," respectively.)

Extending between the high-pressure line 65*a* and the low-pressure line 65*b* are two bypass lines, i.e., a first bypass line 50*e* and a second bypass line 50*d*.

The first bypass line 50*e* has connected thereto the oil channel 71*a* communicating with the secondary side of the pressure reduction valve 670. Through the filter 82, the charge pump 55 draws in the oil within the differential gear unit casing 31 serving also as an oil tank. The pump discharges the oil to a first bypass line 50*e* through the reduction valve 670. The first bypass line 50*e* is further provided, at opposite sides of its connection to the oil channel 71*a*, with check valves 51*a*, 52*a* for permitting the oil to flow from the oil channel 71*a* into the closed circuit while preventing the oil from flowing from the closed circuit into the oil channel 71*a*.

The check valve 51*a* provided at the high-pressure side between the high-pressure line 65*a* and the connection has connected in parallel therewith a relief valve 51*b* for controlling the upper limit of oil pressure of the line 65*a*. The relief valve 51*b* provided prevents an abnormal rise of oil pressure in the high-pressure line 65*a* in the event of an abrupt load acting on the vehicle. On the other hand, a leak valve 52*b* for giving a wider neutral range to the HST is connected in parallel with the check valve 52*a* provided at the low-pressure side between the low-pressure line 65*b* and the connection.

A second charge line 50*f* is connected to the second bypass line 50*d*. The second bypass line 50*d* is further provided, at opposite sides of its connection to the second charge line 50*f*, with check valves 53, 53 for permitting the oil to flow from the second charge line 50*f* into the closed circuit while preventing the oil from flowing from the closed circuit into the second charge line 50*f*. The check valves 53, 53 provided compensate for the amount of working fluid within the closed circuit when the vehicle is brought to a halt, preventing the vehicle form freewheeling. As apparently shown in FIG. 13, the check valves 53, 53 have bypass pins 53*a*, 53*a* for forcibly bringing the high-pressure line and the low-pressure line into communication to facilitate the rotation of the wheels when the HST malfunctions, For example in the case where the vehicle is drawn in the event of the vehicle malfunctioning, the motor shaft operatively connected to the wheels also rotates. The rotation of the motor shaft produces a pressure difference between the high-pressure line and the low-pressure line. If these pressure lines are connected only by the HST motor and the HST pump at this time, the pressure difference remains unless the input shaft of the HST motor is rotated. Accordingly the forcible traction of the vehicle involves the rotation load of the HST pump input shaft and the drive source output shaft, whereas the second bypass line, if forcibly opened by the bypass pins, brings the high-pressure line and the low-pressure line into communication, eliminating the pressure difference due to the rotation of the motor shaft. Thus, the motor shaft is easily rotatable even when the wheels are forcibly rotated as by traction, reducing the load involved in the traction.

A description will be given next of a hydraulic circuit included in the pressure oil supply system of the present embodiment and hydraulic devices having their operation controlled by the pressure oil supplied by the system. Indicated at 105 and 81 in FIG. 14 are a front mower lift and power steering device serving as the hydraulic devices.

As previously stated, the hydraulic pump 2 is adapted to draw in the oil within the casing 31 of the differential gear unit through the intake line 4 and to supply the pressure oil to the hydraulic devices 105, 81 through the discharge line 5. Preferably a filter can be provided in the intake line 4. According to the present embodiment, a downstream line from the filter 82 interposed between the charge pump 55 and the casing 31 is branched into a hydraulic line leading to the charge pump and the intake line 4.

The power steering device 81 comprises a power steering cylinder 105*b* coupled to the steerable wheels, and a power steering valve unit 83 for controlling the supply of pressure oil from the discharge line 5 to the cylinder 105*b*. The valve unit 83 comprises a rotary directional selecting valve 83*a* operatively connected to the steering wheel at the driver's seat for effecting an oil channel change-over, and a relief valve 83*b* for controlling the pressure of oil to be supplied to the cylinder 105*b*.

On the other hand, the front mower lift 61 comprises a lift arm 106 connected to the mower, lift cylinder 105*a* connected to the lift arm, and lift valve unit 64 for controlling the supply of oil to the lift cylinder. The valve unit 64 comprises a directional selecting valve 64*a* operatively connected to the lever at the driver's seat for effecting an oil channel change-over, relief valve 64*b* for controlling the pressure of oil to be supplied to the lift cylinder, needle valve 64*c* for holding the pressure oil in the lift cylinder, and flow control valve 64*d* for preventing the presser oil from abruptly returning from the lift cylinder.

The oil returning from the power steering valve unit 83 and the lift valve unit 64 is cooled by an oil cooler 66 disposed adjacent to a radiator 65 (see FIG. 1) and supplied to the housing 21 through an inlet 21*d*. After cooling the oil within the housing, the oil is returned to the casing 31 of the differential gear unit through an outlet 21*e*.

With the present embodiment as seen in FIG. 7, the inlet 21*d* is positioned at an upper portion of the housing main body 21*a*, and the outlet 21*e* at an upper portion of the housing extension 21*b*. This results in the following advantage. The cooled oil is supplied to the housing main body 21*a* enclosing the HST pump 22 and HST motor 23 therein and is drawn off from the extension 21*b* extending from the main body 21*a* toward one side widthwise of the vehicle. Within the housing 21, the oil therefore flows from the main body 21*a* toward the extension 21*b*. The cooled oil can accordingly be circulated through the entire housing to efficiently cool the interior of the housing. The extension of the housing 21 has the bulging portion 21*f* at its lower portion, with the magnet member 21*g* provided in the bulging portion, so that iron particles entrained in the flow of oil can be held in the bulging portion 21*f*. This effectively precludes the HST pump and motor from malfunctioning due to the presence of iron particles.

The hydraulic device to be installed in the vehicle has been described with reference to the lift for the mower disposed in front of the vehicle body and to the power steering device according to present embodiment, whereas the invention is not limited to the embodiment but can be applied to various hydraulic devices, nor is the invention limited by the position where the hydraulic device is installed.

Other Embodiments of Transmission Mechanism

Figure 18:
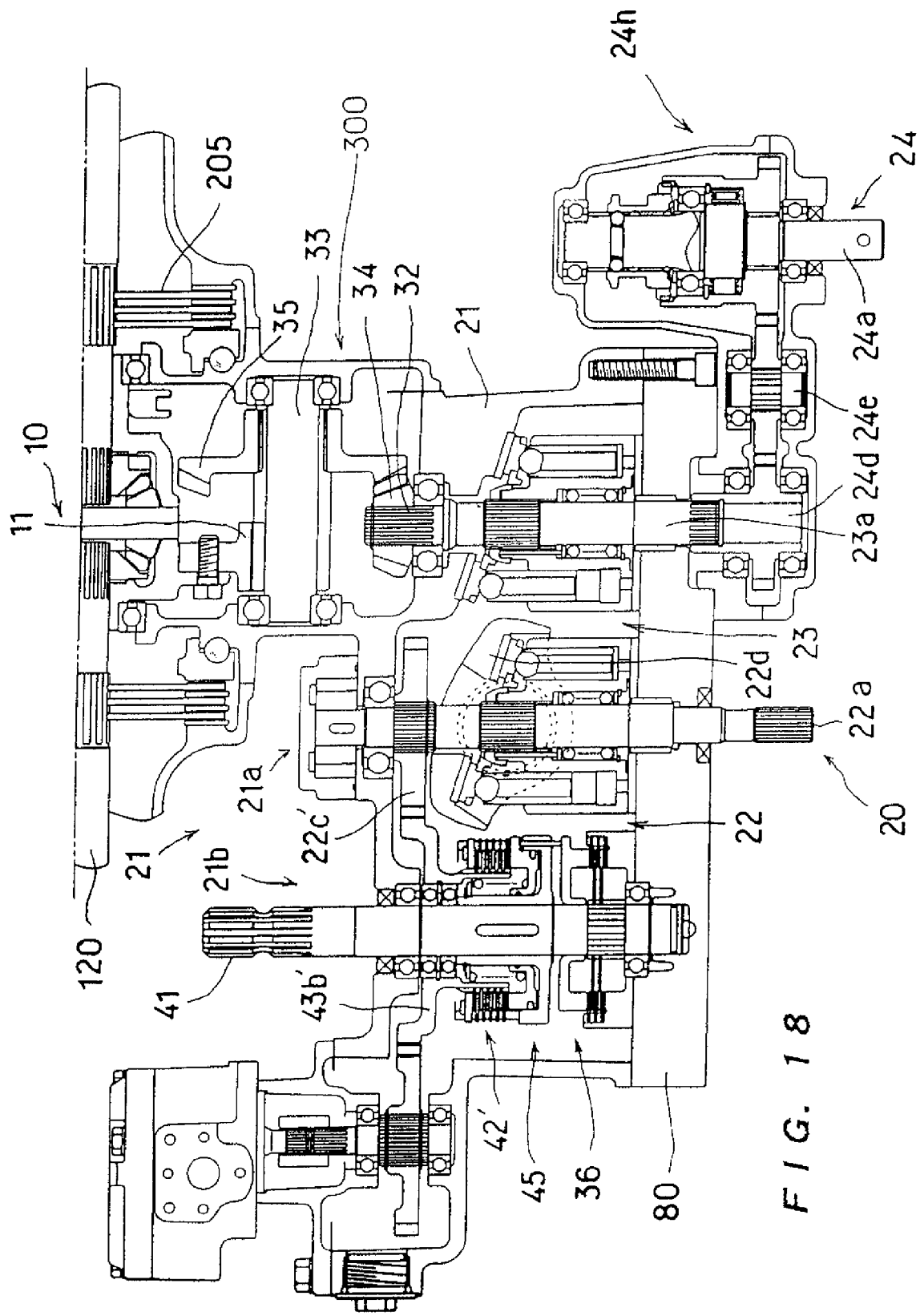

Another preferred embodiment of transmission mechanism of the invention will be described with reference to FIG. 18. FIG. 18 is a plan view in development and in section of the transmission mechanism of the embodiment. Throughout the drawings, like parts or corresponding parts will be designated by like numerals or symbols and will not be described repeatedly.

In place of the transmission casing main body 31*a* and the HST housing 21 included in the transmission mechanism of the foregoing embodiment, these components are integrally made into a casing 300 according to the present embodiment.

The transmission mechanism thus constructed has the same advantages as the preceding embodiment and attains a further reduction in cost due to a decreased number of parts used.

For the integral casing 300 to accommodate therein the differential gear unit 10, travel cooperative mechanism, HST 20 and PTO cooperative mechanism according to the present embodiment, the oil-channel block 80 is disposed to the rear of the HST, and a gear 22' is positioned in front of the hydraulic pump main body and in engagement with the hydraulic clutch 45 providing the PTO cooperative mechanism.

The present invention is not limited to the embodiments described but can be modified variously within the scope of technical concept as set forth in the appended claims.

For example, although the embodiments have been described with reference to a front mount mower tractor, the invention is applicable not only to such tractors but also to various work vehicles equipped with a work device externally of the vehicle body at the front or rear side thereof.

Although gears are used for the cooperative mechanisms in the foregoing embodiments, the invention is not limited to such mechanisms, but various mechanical cooperative mechanisms comprising, for example, a chain are usable.

The differential gear unit, transmission and HST are arranged in the approximate center of the vehicle body with respect the widthwise direction thereof in view of the balance of the vehicle, whereas the invention is not limited to such an arrangement. Insofar as these components are arranged in the order mentioned, these components can be arranged at different positions with respect to the widthwise direction.

Advantages of Embodiments of the Invention

The transmission mechanism embodying the first feature of the present invention comprises a travel power transmission path for transmitting power from a drive source through a HST to a differential gear unit for driving axles positioned toward a first direction, and a PTO power transmission path for dividedly transmitting power from the travel power transmission path to a PTO shaft for driving a work vehicle, a transmission being disposed between the differential gear unit and the HST to provide the travel power transmission path, a housing of the HST having the PTO shaft projecting therefrom and transmission means accommodated therein and coupling the PTO shaft to a pump shaft to constitute the PTO power transmission path. Accordingly, the PTO shaft can be positioned toward a second direction. The transmission mechanism therefore has a simple construction and is adapted to give a shortened overall length to the vehicle while permitting a transmission shaft connecting the PTO shaft to the input shaft of the work device to be positioned closer to a horizontal.

The HST housing has a main body accommodating a hydraulic pump and a hydraulic motor therein, and an extension extending from the main body toward widthwise one side of the vehicle body, the main body having an opening at a side thereof toward the first direction, the extension having an opening at a side thereof toward the second direction, the PTO shaft projecting from the extension, the opening of the main body being closed with a hydraulic block. The block can then be shortened in length in the widthwise direction and becomes less costly owing to a reduction in material cost. When the HST housing has such a structure, the mold for the main body is removable toward the first direction, and the mold for the extension toward the second direction. This assures greater ease in producing the HST housing by casting.

When the HST housing has a main body accommodating the hydraulic pump and the hydraulic motor therein, and an extension extending from the main body toward widthwise one side of the vehicle body, with the PTO shaft projecting from the extension and with the pump shaft and the motor shaft arranged in approximately the same horizontal plane, the drive shaft to be connected to the pump shaft can then be positioned at a lower level. This affords improved running stability to the vehicle due to the lowered center of gravity thereof.

When the casing of the transmission is adapted to accommodate the differential gear unit therein, a separate casing need not be provided for the gear unit to achieve a cost reduction due to a decreased material cost.

A cost reduction due to a reduction in material cost can also be attained by making the transmission casing and the HST housing into an integral structure.

The transmission casing may comprise a main body for accommodating a travel cooperative mechanism, and an extension extending from the main body toward the other widthwise side of the vehicle body, the extension supporting thereon an output shaft for driving axles positioned toward the second direction and being provided with transmission means coupled to the travel cooperative mechanism. While positioning the drive source at a lower level to lower the center of gravity of the vehicle and thereby give improved running stability to the vehicle, this construction makes it possible to position the coupling rod for the second-direction axles free of interference with the drive source, whereby four-wheel drive can be realized for the vehicle.

If the casing main body is made separable from the extension, the casing main body can be prepared as a common part, such that when there arises a need to take off a driving force for the second-direction axles, the portion of extension can be attached to the common part. This results in easier stock management of parts, further making is possible to alter the specifications of the vehicle with ease after shipment.

The transmission mechanism embodying the second feature of the present invention for use in vehicles is adapted to transmit power from a drive source installed in the vehicle to a differential gear unit for driving axles positioned toward a first direction, via an HST disposed toward the first direction from the drive source, the HST having a motor shaft with a first-direction end projecting from a housing of the HST toward the first direction and connected to the gear unit, the motor shaft having a second-direction end projecting from the housing toward a second direction. This construction eliminates the need for the transmission to be disposed between the HST and the differential gear unit for dividing the power into a driving force for first-direction wheels and a driving force for second-direction wheels, consequently leading to a cost reduction. Since the transmission serving as a power transmission path for both the driving forces need not be provided, the vehicle is given improved reliability and can be assembled with an improved efficiency.

The HST housing may be provided with a second-direction wheel output unit extending in the second direction and positioned toward one side with respect to the widthwise direction of the vehicle, the output unit having a second-direction wheel drive shaft at an end thereof toward the widthwise side. The drive source to be installed at the second-direction side of the HST can then be positioned at a lower level. This renders the vehicle compact and improves the running stability of the vehicle.

The second-direction wheel output unit may be provided, at the above-mentioned widthwise end thereof, with a bulging part, with a clutch mechanism disposed in the bulging part for permitting the second-direction wheels to rotate at a higher speed than the first-direction wheels when the vehicle is driven forward while permitting the first-direction wheels and the second-direction wheels to rotate at the same speed when the wheel is driven reversely. An increase in the size of the vehicle is then avoidable despite the provision of the clutch mechanism.

When the transmission mechanism comprises an intake channel holding the housing in communication with the case for introducing drain oil from the interior of the housing into the case, and a discharge channel for discharging the oil from the case, the hydraulic fluid of the HST is usable also as lubricating oil for the second-direction wheel output unit.

The transmission mechanism may be so constructed that the discharge channel holds the case in communication with a casing of the differential gear unit, the intake channel communicating with the case at a position downstream from a meshing point of gears constituting the cooperative mechanism with respect to the directions of rotation the gears when the vehicle is driven forward, the discharge channel communicating with the case at a position upstream from the meshing point of the gears with respect to the directions of rotation thereof when the vehicle is driven forward. The rise of temperature of the oil within the HST housing can then be effectively prevented while permitting the hydraulic fluid of the HST serving also as the lubricating oil for the output unit.

The transmission mechanism embodying the third feature of the present invention for use in vehicles is adapted to transmit power from a drive source installed in a body of the vehicle to a travel device and a PTO unit via an HST disposed outwardly of the drive source in a longitudinal direction of the vehicle, the transmission mechanism comprising a PTO shaft, a hydraulic clutch for effecting or interrupting power transmission to the PTO shaft, a charge pump for supplying a hydraulic fluid to the clutch, and a hydraulic circuit for interconnecting the clutch and the charge pump, the HST comprising a housing having a main body accommodating the hydraulic pump and the hydraulic motor therein, and an extension extending from the main body toward one side with respect to the widthwise direction of the vehicle, the charge pump having a casing liquid-tightly surrounding an outer end of the pump shaft projecting outward longitudinally of the vehicle, the charge pump being adapted to perform a pumping action by the rotation of the pump shaft, the PTO shaft being supported by the housing extension longitudinally of the vehicle and having an outer end projecting outward longitudinally of the vehicle, the hydraulic clutch being supported by the PTO shaft within the housing extension. The transmission mechanism therefore serves to shorten the overall length of the vehicle, position the PTO shaft for driving the mower or the like longitudinally inwardly of the vehicle and give a distance between the drive source and the HST at the same time.

The housing may have an inner wall extending widthwise of the vehicle so as to face the drive source, opposite side walls extending longitudinally of the vehicle and joined to respective opposite ends of the inner wall each at one end thereof and an outer wall extending widthwise of the vehicle and joined to the other ends of the side walls, the outer wall having an opening formed in a region thereof corresponding to the housing main body, the inner wall having an opening formed in a region thereof corresponding to the housing extension, the opening of the outer wall being closed with a hydraulic block, the opening of the inner wall being closed with a closing member. The hydraulic block which is disposed at one side of the housing longitudinally outward thereof can then be diminished in size.

The hydraulic circuit comprises a flow dividing member provided in a discharge channel of the charge pump for supplying oil discharged from the charge pump dividedly to the HST and the hydraulic clutch, and a change-over member interposed between the flow dividing member and the hydraulic clutch for effecting or interrupting the supply of oil to the hydraulic clutch, the flow dividing member being disposed in a casing of the charge pump, the change-over member being disposed in the closing member. Oil channels can then be formed by boring with ease.

When an oil channel interconnecting the flow dividing member and the change-over member is made to extend through the housing, the channel can be given improved durability, effectively preventing the oil from leaking from the channel.

When a hydraulic shock absorbing member is provided in the closing member at a position downstream from the change-over member, the power transmission to the PTO shaft through the clutch can be effected smoothly.

The pressure oil supply system embodying the fourth feature of the present invention is for used in a vehicle which is so adapted that power from a drive source installed in a body of the vehicle is transmitted to drive axles via an HST disposed closer to longitudinal one side of the vehicle than the drive source and via a differential gear device coupled to the HST at one side thereof toward said one longitudinal side, the system comprising a hydraulic pump provided in a housing of the HST, the differential gear device having a casing made serviceable as an oil tank for the hydraulic pump. The system is therefore adapted to use a shortened intake line for interconnecting the hydraulic pump and the oil tank, effectively preventing the impairment of the operation efficiency of the pump due to the piping resistance of the intake line. The system produces no vibration difference between the hydraulic pump and the oil tank, consequently eliminating the need to use a flexible tube or the like for the intake line to thereby achieve a cost reduction.

The housing of the HST has a main body accommodating the HST pump and the HST motor therein, and an extension extending from the main body toward widthwise one side of the vehicle, the extension having a bottom portion bulging downward to a lower level than a bottom portion of the main body, a magnet member being disposed within the downwardly bulging portion of the extension. The magnet member then attracts iron particles in the oil within the housing, whereby the HST pump and motor can be effectively prevented from malfunctioning due to the presence of such iron particles.

The housing main body of the HST has an inlet formed in an upper portion thereof for admitting return oil from the hydraulic device, the housing extension being formed with an outlet for recycling to the casing the portion of oil contained in the housing in excess of a predetermined amount. The oil within the housing can be caused to flow from the main body toward the extension, whereby iron particles can be effectively attracted by the magnet member.

When the return oil is used as a cooling oil, the oil within the housing can be cooled effectively.

When the hydraulic pump is attached to the housing at a side thereof toward the other longitudinal side of the vehicle, the pump will not project outward widthwise of the vehicle and can be effectively precluded from coming into contact with other article during driving.

What is claimed is:

1. A hydrostatic transmission (HST) comprising a hydraulic pump that receives engine power and generates hydraulic pressure, and a hydraulic motor drivingly connected to driving wheels; the hydraulic pump and the hydraulic motor being hydraulically connected to each other; the HST further comprising:
   a housing accommodating both the hydraulic pump and the hydraulic motor;
   a pump shaft of the hydraulic pump and a motor shaft of the hydraulic motor, both supported by the housing and configured in a substantially horizontal plane with respect to ground; and
   a first power take-off (PTO) shaft and a second PTO shaft, both supported by the housing;
   the first PTO shaft being drivingly connected to the pump shaft and the second PTO shaft being drivingly connected to the motor shaft.

2. The HST according to claim 1, wherein the first PTO shaft and the second PTO shaft are disposed in parallel with each other, and extend outward from opposite sides of the housing.

3. The HST according to claim 1, wherein the motor shaft is configured to drive a first set of wheels and the second PTO shaft is configured to drive a second set of wheels.

4. The HST according to claim 3, wherein the first set of the wheels comprise front wheels and the second set of the wheels comprise rear wheels.

* * * * *